(12) United States Patent
Wang et al.

(10) Patent No.: US 10,715,239 B2
(45) Date of Patent: *Jul. 14, 2020

(54) METHOD FOR FEEDING BACKCHANNEL STATE INFORMATION, USER EQUIPMENT, AND BASE STATION

(71) Applicant: HUAWEI TECHNOLOGIES CO., LTD., Shenzhen, Guangdong (CN)

(72) Inventors: Jianguo Wang, Beijing (CN); Yongxing Zhou, Beijing (CN); Leiming Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/599,877

(22) Filed: Oct. 11, 2019

(65) Prior Publication Data

US 2020/0044713 A1 Feb. 6, 2020

Related U.S. Application Data

(63) Continuation of application No. 16/268,284, filed on Feb. 5, 2019, now Pat. No. 10,484,069, which is a (Continued)

(51) Int. Cl.
*H04B 7/06* (2006.01)
*H04N 19/124* (2014.01)
(Continued)

(52) U.S. Cl.
CPC ......... *H04B 7/0626* (2013.01); *H04B 7/0634* (2013.01); *H04B 7/0639* (2013.01);
(Continued)

(58) Field of Classification Search
CPC .. H03M 7/00; H04B 1/38; H04B 7/02; H04B 7/04; H04B 7/0456; H04B 7/06;
(Continued)

(56) References Cited

U.S. PATENT DOCUMENTS 8,611,243 B2 12/2013 Ko et al.
8,711,907 B2 4/2014 Zhu et al.
(Continued)

FOREIGN PATENT DOCUMENTS

CN 101394216 3/2009
CN 101867463 10/2010
(Continued)

OTHER PUBLICATIONS

3GPP TS 36.211 V11.1.0 (Dec. 2012), 3rd Generation Partnership Project, Technical Specification Group Radio Access Network, Evolved Universal Terrestrial Radio Access (E-UTRA), Physical Channels and Modulation(Release 11), Dec. 2012, 126 pages.
(Continued)

*Primary Examiner* — Shawkat M Ali
(74) *Attorney, Agent, or Firm* — Fish & Richardson P.C.

(57) ABSTRACT

The present disclosure relates to methods for feeding back channel state information, user equipment, and base stations. One example method includes receiving a reference signal from a base station, selecting a precoding matrix W from a codebook according to the reference signal, and sending a precoding matrix indicator (PMI) to the base station, where the PMI corresponds to the selected precoding matrix W.

24 Claims, 2 Drawing Sheets

Related U.S. Application Data continuation of application No. 15/668,531, filed on Aug. 3, 2017, now Pat. No. 10,230,443, which is a continuation of application No. 15/229,576, filed on Aug. 5, 2016, now Pat. No. 9,729,222, which is a continuation of application No. 14/753,490, filed on Jun. 29, 2015, now Pat. No. 9,438,328, which is a continuation of application No. PCT/CN2012/087699, filed on Dec. 27, 2012.

(51) Int. Cl.
  *G06F 17/16* (2006.01)
  *H04B 7/0413* (2017.01)

(52) U.S. Cl.
  CPC ............ *G06F 17/16* (2013.01); *H04B 7/0413* (2013.01); *H04N 19/124* (2014.11)

(58) Field of Classification Search
  CPC .... H04B 7/0626; H04B 7/0639; H04B 15/00; H04B 17/00; H04J 1/16; H04J 3/14; H04J 11/00; H04L 1/00; H04L 1/02; H04L 5/00; H04L 5/14; H04L 12/26; H04L 25/03; H04L 25/49; H04L 27/00; H04L 27/26; H04L 27/28; H04W 4/00; H04W 24/08; H04W 24/10; H04W 40/00; H04W 72/02; H04W 72/04; H04W 72/0406; H04W 72/10; H04W 88/08
  USPC ........ 341/106; 370/210, 241, 248, 252, 328, 370/329, 334, 335; 375/140, 219, 259, 375/260, 267, 295, 296, 316, 349; 455/101; 704/238; 708/520, 607
  See application file for complete search history.

(56) References Cited

U.S. PATENT DOCUMENTS

| | | | |
|---|---|---|---|
| 10,484,069 B2* | 11/2019 | Wang | H04B 7/0634 |
| 2008/0292013 A1 | 11/2008 | Varadarajan et al. | |
| 2009/0046800 A1 | 2/2009 | Xu et al. | |
| 2009/0323841 A1 | 12/2009 | Clerckx et al. | |
| 2011/0032839 A1 | 2/2011 | Chen et al. | |
| 2011/0128917 A1 | 6/2011 | Ko et al. | |
| 2011/0158219 A1 | 6/2011 | Ko et al. | |
| 2011/0170623 A1 | 7/2011 | Park et al. | |
| 2011/0268207 A1 | 11/2011 | Choi et al. | |
| 2011/0273993 A1 | 11/2011 | Mazzarese et al. | |
| 2012/0039251 A1* | 2/2012 | Sayana | H04B 7/0639 370/328 |
| 2012/0082149 A1 | 4/2012 | Kim et al. | |
| 2012/0082190 A1* | 4/2012 | Zhu | H04B 7/063 375/219 |
| 2012/0219042 A1 | 8/2012 | Onggosanusi et al. | |
| 2013/0064276 A1 | 3/2013 | Kim et al. | |
| 2013/0156125 A1 | 6/2013 | Ko et al. | |
| 2013/0202057 A1 | 8/2013 | Chen et al. | |
| 2013/0230081 A1 | 9/2013 | Wernersson et al. | |
| 2013/0230118 A1 | 9/2013 | Onggosanusi et al. | |
| 2013/0242921 A1 | 9/2013 | Kim et al. | |
| 2014/0056156 A1* | 2/2014 | Jongren | H04L 1/0026 370/252 |
| 2014/0105317 A1 | 4/2014 | Erell et al. | |
| 2014/0112406 A1 | 4/2014 | Zhu | |
| 2014/0301496 A1 | 10/2014 | Ko et al. | |
| 2014/0369436 A1 | 12/2014 | Zhang et al. | |

FOREIGN PATENT DOCUMENTS

| | | |
|---|---|---|
| CN | 102158315 | 8/2011 |
| CN | 102763345 | 10/2012 |
| JP | 2011223555 | 11/2011 |
| RU | 2010109400 | 9/2011 |
| RU | 2454831 | 6/2012 |
| WO | 2008054178 | 5/2008 |
| WO | 2011126341 | 10/2011 |

OTHER PUBLICATIONS

3GPP TS 36.213 v10.8.0, 3rd Generation Partnership Project, Technical Specification Group Radio Access Network; Evolved Universal Terrestrial Radio Access (E-UTRA), Physical layer procedures (Release 10), Dec. 2012, 126 pages.
3GPP TS 36.213 V11.1.0 (Dec. 2012), 3rd Generation Partnership Project, Technical Specification Group Radio Access Network, Evolved Universal Terrestrial Radio Access (E-UTRA), Physical layer procedures(Release 11), Dec. 12, 160 pages.
3GPP™ Work Item Description, "Further Downlink MIMO Enhancement for LTE-Advanced—Core Part and Feature and Performance part" RP-121416, Sep. 7, 2012, 17 pages.
Alcatel-Lucent Shanghai Bell, "Considerations on CSI feedback enhancements for high-priority antenna configurations" 3GPP TSG-RAN WG1 #66, R1-112420, Athens, Greece, Aug. 22-26, 2011, 7 pages.
Ericsson et al., "Precoder Codebook Design for 4-branch MIMO" 3GPP Draft, 3GPP TSG RAN WG1 Meeting #66bis, R1-113433, Zhuhai, P.R.China, Oct. 10-14, 2011.
Ericsson, "Design and Evaluation of Precoder Codebooks for CSI Feedback" 3rd Generation Partnership Project Ran WG1, R1-103839, Dresden, Germany, Jun. 28, 2010.
Ericsson, "Design and Evaluation of 4 Tx Precoder Codebooks for CSI Feedback", 3GPP TSG-RAN WG1 #62, R1-105056, Madrid, Spain, Aug. 23-27, 2010, 7 pages.
Kim et al., "Simplified Differential Feedback Method for IEEE 802.16m CL SU/MU-MIMO" IEEE 802.16 Broadband Wireless Access Working Group Jan. 5, 2009, 5 pages.
Li et al., "Codebook design for IEEE 802.16m MIMO Schemes" IEEE 802.16 Broadband Wireless Access Working Group, Sep. 2008, 14 pages.
Li et al., "Differential feedback for IEEE 802.16m MIMO Schemes" IEEE 802.16 Broadband Wireless Access Working Group, Mar. 2009, 5 pages.
Li et al., "Differential feedback for IEEE 802.16m MIMO Schemes" IEEE 802.16 Presentation Submission Template (Rev. 9), Mar. 2009, 47 pages.
Motorola, "4 Tx Codebook Design based on Two-Component Framework", 3GPP TSG RAN1 #62, R1-104980, Madrid, Spain, Aug. 23-27, 2010, 15 pages.
Motorola, "8 TX Codebook Design based on Two Component Framework", 3GPP TSG RAN1 #62, R1-104981, Aug. 23-27, 2010, 7 pages.
Wu et al., "Codebook Design for LTE-A Downlink System" 2011 IEEE Vehicular Technology Conference, Sep. 2011, 5 pages.

* cited by examiner

METHOD FOR FEEDING BACKCHANNEL STATE INFORMATION, USER EQUIPMENT, AND BASE STATION

CROSS-REFERENCE TO RELATED APPLICATIONS

This application is a continuation of U.S. patent application Ser. No. 16/268,284, filed on Feb. 5, 2019, which is a continuation of U.S. patent application Ser. No. 15/668,531, filed on Aug. 3, 2017, now U.S. Pat. No. 10,230,443, which is a continuation of U.S. patent application Ser. No. 15/229,576, filed on Aug. 5, 2016, now U.S. Pat. No. 9,729,222, which is a continuation of U.S. patent application Ser. No. 14/753,490, filed on Jun. 29, 2015, now U.S. Pat. No. 9,438,328, which is a continuation of International Application No. PCT/CN2012/087699, filed on Dec. 27, 2012. All of the afore-mentioned patent applications are hereby incorporated by reference in their entireties.

TECHNICAL FIELD

The present invention relates to the field of mobile communications, and in particular, to a method for feeding back channel state information, a user equipment, and a base station.

BACKGROUND

A multiple-input multiple-output (MIMO) wireless communication system may obtain diversity and array gains by using beam forming (BF) and receive signal combination, or by using precoding and receive signal combination. Typically, a wireless communication system using BF or precoding may be generally expressed as y=HVs+n, where y is a received signal vector, H is a channel matrix, V is a precoding matrix, s is a transmitted symbol vector, and n is measurement noise. Generally, optimal precoding requires that channel state information (CSI) is fully known to a transmitter, and a commonly used method is that a user equipment (UE) performs quantization on instantaneous CSI and feeds back the quantized instantaneous CSI to a node B (NodeB). CSI fed back by an existing Long Term Evolution Release 8 (LTE R8) system includes a rank indicator (RI), a precoding matrix indicator (PMI), a channel quality indicator (CQI), and the like, where the RI and the PMI respectively indicate the number of used layers and a precoding matrix. Generally, a set of used precoding matrices is called a codebook, and each precoding matrix in the codebook is called a code word. A codebook of LTE R8 is mainly designed for single user multiple-input multiple-output (SU-MIMO), where a precoding matrix or a code word is restrained by 8 phase shift keying (8PSK), and precision of spatial quantization is limited. For a transmission manner in which precision of spatial quantization is sensitive, such as multiple user multiple-input multiple-output (MU-MIMO), performance of the transmission manner is severely limited by the codebook of LTE R8. To meet a higher system requirement, a 3rd Generation Partnership Project (3GPP) LTE system needs to further enhance performance of MU-MIMO. In addition, a coordinated multiple-points (CoMP) transmission technology is introduced (currently, CoMP is based on a single-cell feedback). The foregoing two technologies both have a higher requirement on feedback performance.

In the prior art, a single codebook is used to feed back RIs and PMIs. By using four antennas as an example, a correspondence between an RI, a PMI, and each code word in the codebook is shown in the following Table 1:

TABLE 1

| PMI | $u_n$ | RI 1 | RI 2 | RI 3 | RI 4 |
|---|---|---|---|---|---|
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ 1\ -1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ |

$W_n^{\{s\}}$ indicates a matrix that includes a column set $\{s\}$ of a matrix $W_n = I - 2u_n u_n^H / u_n^H u_n$, where I is a 4×4 identity matrix, and $u_n$ is provided by the foregoing table. In an existing LTE R8 system, there are two PMI feedback manners: one manner is that one PMI is fed back for entire system bandwidth; and the other manner is that, the system is divided into multiple bandwidth parts (BP) and each BP includes multiple sub-bands, and PMIs are fed back for different sub-bands. The former manner is generally called broadband PMI, and the latter manner is generally called sub-band PMI.

It can be learned from thorough investigation on the foregoing Table 1 that, in a precoding matrix obtained based on $W_n = I - 2u_n u_n^H / u_n^H u_n$, in the prior art, a phase of each element is subject to an 8PSK restraint; that is, a phase difference between different elements is a multiple of π/4, and it is difficult to describe a smaller spatial granularity difference, such as a phase difference of π/16 or π/8 between antenna ports. Therefore, feedback precision of CSI is reduced, and it is difficult to meet a feedback precision requirement of a technology such as MU-MIMO or CoMP transmission.

SUMMARY

Embodiments of the present invention provide a method for feeding back channel state information, a user equipment, and a base station, to improve feedback precision of channel state information.

According to a first aspect, an embodiment of the present invention provides a method for feeding back channel state information, where the method includes:

receiving a reference signal sent by a base station;

selecting a precoding matrix W from a codebook according to the reference signal, where a column vector of the precoding matrix W may be expressed as $\alpha[v \ e^{j\phi}v]^T$, $v=[1 \ e^{j\theta}]$, where $\alpha$ is a constant, $\theta$ and $\phi$ are phases, and $[\ ]^T$ indicates transposing of a matrix or vector; and sending a precoding matrix indicator PMI to the base station, where the PMI is corresponding to the selected precoding matrix W.

With reference to the first aspect, in a first possible implementation manner, where the precoding matrix W is at least one matrix in the following matrix set:

$$\left\{ \frac{1}{\sqrt{12}}\begin{bmatrix} 1 & 1 & 1 \\ e^{j\theta} & e^{j\theta} & -e^{j\theta} \\ 1 & -1 & -1 \\ e^{j\theta} & -e^{j\theta} & e^{j\theta} \end{bmatrix}, \frac{1}{\sqrt{12}}\begin{bmatrix} 1 & 1 & 1 \\ -e^{j\theta} & e^{j\theta} & -e^{j\theta} \\ 1 & -1 & -1 \\ -e^{j\theta} & -e^{j\theta} & e^{j\theta} \end{bmatrix}, \right.$$
$$\left. \frac{1}{\sqrt{12}}\begin{bmatrix} 1 & 1 & 1 \\ e^{j\theta} & -e^{j\theta} & -e^{j\theta} \\ 1 & 1 & -1 \\ e^{j\theta} & -e^{j\theta} & e^{j\theta} \end{bmatrix}, \frac{1}{\sqrt{12}}\begin{bmatrix} 1 & 1 & 1 \\ -e^{j\theta} & e^{j\theta} & e^{j\theta} \\ 1 & 1 & -1 \\ -e^{j\theta} & e^{j\theta} & -e^{j\theta} \end{bmatrix} \right\} \text{ where}$$

$$\theta = \frac{\pi}{8}(4i_1 + 2\lfloor i_2/4 \rfloor),$$

$i_1 = 0, 1, 2, 3,$ $i_2 = 0, \ldots, 15,$ and $\lfloor i_2/4 \rfloor$ indicates the greatest integer not greater than $i_2/4$.

With reference to the first aspect, in a second possible implementation manner, where the precoding matrix W is at least one matrix in the following matrix set:

$$\left\{ \frac{1}{4}\begin{bmatrix} 1 & 1 & 1 & 1 \\ e^{j\theta} & -e^{j\theta} & e^{j\theta} & -e^{j\theta} \\ 1 & 1 & -1 & -1 \\ e^{j\theta} & -e^{j\theta} & -e^{j\theta} & e^{j\theta} \end{bmatrix}, \frac{1}{4}\begin{bmatrix} 1 & 1 & 1 & 1 \\ e^{j\theta} & -e^{j\theta} & e^{j\theta} & -e^{j\theta} \\ j & j & -j & -j \\ je^{j\theta} & -je^{j\theta} & -je^{j\theta} & je^{j\theta} \end{bmatrix} \right\}$$

or $$\left\{ \frac{1}{4}\begin{bmatrix} 1 & 1 & 1 & 1 \\ e^{j\theta} & e^{j\theta} & -e^{j\theta} & -e^{j\theta} \\ 1 & -1 & 1 & -1 \\ e^{j\theta} & -e^{j\theta} & -e^{j\theta} & e^{j\theta} \end{bmatrix}, \frac{1}{4}\begin{bmatrix} 1 & 1 & 1 & 1 \\ e^{j\theta} & e^{j\theta} & -e^{j\theta} & -e^{j\theta} \\ j & -j & j & -j \\ je^{j\theta} & -je^{j\theta} & -je^{j\theta} & je^{j\theta} \end{bmatrix} \right\} \text{ where}$$

$$\theta = \frac{\pi}{8}(4i_1 + 2\lfloor i_2/2 \rfloor),$$

$i_1 = 0, 1, 2, 3,$ $i_2 = 0, \ldots, 7,$ and $\lfloor i_2/2 \rfloor$ indicates the greatest integer not greater than $i_2/2$.

With reference to the first or second implementation manner, in a third possible implementation manner, where the sending a precoding matrix indicator PMI to the base station comprises: sending a first precoding matrix indicator $PMI_1$ and a second precoding matrix indicator $PMI_2$ to the base station, wherein the first precoding matrix indicator $PMI_1$ and the second precoding matrix indicator $PMI_2$ are respectively used to indicate indexes $i_1$ and $i_2$ corresponding to the selected precoding matrix W.

According to a second aspect, an embodiment of the present invention further provides a method for feeding back channel state information, where the method includes:

sending a reference signal to a user equipment UE;

receiving a precoding matrix indicator PMI sent by the UE, where the PMI is corresponding to a precoding matrix W that is selected by the UE from a codebook based on the reference signal, and a column vector of the precoding matrix W may be expressed as $\alpha[v \ e^{j\phi}v]^T$, $v=[1 \ e^{j\theta}]$, where $\alpha$ is a constant, $\theta$ and $\phi$ are phases, and $[\ ]^T$ indicates transposing of a matrix or vector.

With reference to the second aspect, in a first possible implementation manner, where the precoding matrix W is at least one matrix in the following matrix set:

$$\left\{ \frac{1}{\sqrt{12}}\begin{bmatrix} 1 & 1 & 1 \\ e^{j\theta} & e^{j\theta} & -e^{j\theta} \\ 1 & -1 & -1 \\ e^{j\theta} & -e^{j\theta} & e^{j\theta} \end{bmatrix}, \frac{1}{\sqrt{12}}\begin{bmatrix} 1 & 1 & 1 \\ -e^{j\theta} & e^{j\theta} & -e^{j\theta} \\ 1 & -1 & -1 \\ -e^{j\theta} & -e^{j\theta} & e^{j\theta} \end{bmatrix}, \right.$$
$$\left. \frac{1}{\sqrt{12}}\begin{bmatrix} 1 & 1 & 1 \\ e^{j\theta} & -e^{j\theta} & -e^{j\theta} \\ 1 & 1 & -1 \\ e^{j\theta} & -e^{j\theta} & e^{j\theta} \end{bmatrix}, \frac{1}{\sqrt{12}}\begin{bmatrix} 1 & 1 & 1 \\ -e^{j\theta} & e^{j\theta} & e^{j\theta} \\ 1 & 1 & -1 \\ -e^{j\theta} & e^{j\theta} & -e^{j\theta} \end{bmatrix} \right\} \text{ where}$$

$$\theta = \frac{\pi}{8}(4i_1 + 2\lfloor i_2/4 \rfloor),$$

$i_1 = 0, 1, 2, 3,$ $i_2 = 0, \ldots, 15,$ and $\lfloor i_2/4 \rfloor$ indicates the greatest integer not greater than $i_2/4$.

With reference to the second aspect, in a second possible implementation manner, where the precoding matrix W is at least one matrix in the following matrix set:

$$\left\{ \frac{1}{4}\begin{bmatrix} 1 & 1 & 1 & 1 \\ e^{j\theta} & -e^{j\theta} & e^{j\theta} & -e^{j\theta} \\ 1 & 1 & -1 & -1 \\ e^{j\theta} & -e^{j\theta} & -e^{j\theta} & e^{j\theta} \end{bmatrix}, \frac{1}{4}\begin{bmatrix} 1 & 1 & 1 & 1 \\ e^{j\theta} & -e^{j\theta} & e^{j\theta} & -e^{j\theta} \\ j & j & -j & -j \\ je^{j\theta} & -je^{j\theta} & -je^{j\theta} & je^{j\theta} \end{bmatrix} \right\}$$

or $$\left\{ \frac{1}{4}\begin{bmatrix} 1 & 1 & 1 & 1 \\ e^{j\theta} & e^{j\theta} & -e^{j\theta} & -e^{j\theta} \\ 1 & -1 & 1 & -1 \\ e^{j\theta} & -e^{j\theta} & -e^{j\theta} & e^{j\theta} \end{bmatrix}, \frac{1}{4}\begin{bmatrix} 1 & 1 & 1 & 1 \\ e^{j\theta} & e^{j\theta} & -e^{j\theta} & -e^{j\theta} \\ j & -j & j & -j \\ je^{j\theta} & -je^{j\theta} & -je^{j\theta} & je^{j\theta} \end{bmatrix} \right\} \text{ where}$$

$$\theta = \frac{\pi}{8}(4i_1 + 2\lfloor i_2/2 \rfloor),$$

$i_1 = 0, 1, 2, 3,$

-continued $$i_2 = 0, \ldots, 7, \text{ and}$$

$$\lfloor i_2/2 \rfloor$$

indicates the greatest integer not greater than $i_2/2$.

With reference to the first or second implementation manner, in a third possible implementation manner, where the receiving a precoding matrix indicator PMI sent by the UE comprises: receiving a first precoding matrix indicator $PMI_1$ and a second precoding matrix indicator $PMI_2$ that are sent by the UE, wherein the first precoding matrix indicator $PMI_1$ and the second precoding matrix indicator $PMI_2$ are respectively used to indicate indexes $i_1$ and $i_2$ corresponding to the selected precoding matrix.

A third aspect of the present invention provides a user equipment, where the user equipment includes:

a receiving module, configured to receive a reference signal sent by a base station;

a selecting module, configured to select a precoding matrix W from a codebook based on the reference signal received by the receiving module, where a column vector of the precoding matrix W may be expressed as $\alpha[v \ e^{j\phi}v]^T$, $v=[1 \ e^{j\theta}]$, where $\alpha$ is a constant, $\theta$ and $\phi$ are phases, and $[\ ]^T$ indicates transposing of a matrix or vector; and a sending module, configured to send a precoding matrix indicator PMI to the base station, where the PMI is corresponding to the precoding matrix W selected by the selecting module.

With reference to the third aspect, in a first possible implementation manner, where the precoding matrix W is at least one matrix in the following matrix set:

$$\left\{ \frac{1}{\sqrt{12}}\begin{bmatrix} 1 & 1 & 1 \\ e^{j\theta} & e^{j\theta} & -e^{j\theta} \\ 1 & -1 & -1 \\ e^{j\theta} & -e^{j\theta} & e^{j\theta} \end{bmatrix}, \frac{1}{\sqrt{12}}\begin{bmatrix} 1 & 1 & 1 \\ -e^{j\theta} & e^{j\theta} & -e^{j\theta} \\ 1 & -1 & -1 \\ -e^{j\theta} & -e^{j\theta} & e^{j\theta} \end{bmatrix}, \right.$$

$$\left. \frac{1}{\sqrt{12}}\begin{bmatrix} 1 & 1 & 1 \\ e^{j\theta} & -e^{j\theta} & -e^{j\theta} \\ 1 & 1 & -1 \\ e^{j\theta} & -e^{j\theta} & e^{j\theta} \end{bmatrix}, \frac{1}{\sqrt{12}}\begin{bmatrix} 1 & 1 & 1 \\ -e^{j\theta} & e^{j\theta} & e^{j\theta} \\ 1 & 1 & -1 \\ -e^{j\theta} & e^{j\theta} & -e^{j\theta} \end{bmatrix} \right\} \text{ where}$$

$$\theta = \frac{\pi}{8}(4i_1 + 2\lfloor i_2/4 \rfloor),$$

$$i_1 = 0, 1, 2, 3,$$

$$i_2 = 0, \ldots, 15, \text{ and}$$

$$\lfloor i_2/4 \rfloor$$

indicates the greatest integer not greater than $i_2/4$.

With reference to the third aspect, in a second possible implementation manner, where the precoding matrix W is at least one matrix in the following matrix set $$\left\{ \frac{1}{4}\begin{bmatrix} 1 & 1 & 1 & 1 \\ e^{j\theta} & -e^{j\theta} & e^{j\theta} & -e^{j\theta} \\ 1 & 1 & -1 & -1 \\ e^{j\theta} & -e^{j\theta} & -e^{j\theta} & e^{j\theta} \end{bmatrix}, \frac{1}{4}\begin{bmatrix} 1 & 1 & 1 & 1 \\ e^{j\theta} & -e^{j\theta} & e^{j\theta} & -e^{j\theta} \\ j & j & -j & -j \\ je^{j\theta} & -je^{j\theta} & -je^{j\theta} & je^{j\theta} \end{bmatrix} \right\}$$

or

-continued $$\left\{ \frac{1}{4}\begin{bmatrix} 1 & 1 & 1 & 1 \\ e^{j\theta} & e^{j\theta} & -e^{j\theta} & -e^{j\theta} \\ 1 & -1 & 1 & -1 \\ e^{j\theta} & -e^{j\theta} & -e^{j\theta} & e^{j\theta} \end{bmatrix}, \frac{1}{4}\begin{bmatrix} 1 & 1 & 1 & 1 \\ e^{j\theta} & e^{j\theta} & -e^{j\theta} & -e^{j\theta} \\ j & -j & j & -j \\ je^{j\theta} & -je^{j\theta} & -je^{j\theta} & je^{j\theta} \end{bmatrix} \right\} \text{ where}$$

$$\theta = \frac{\pi}{8}(4i_1 + 2\lfloor i_2/2 \rfloor),$$

$$i_1 = 0, 1, 2, 3,$$

$$i_2 = 0, \ldots, 7, \text{ and}$$

$$\lfloor i_2/2 \rfloor$$

indicates the greatest integer not greater than $i_2/2$.

With reference to the first or second implementation manner, in a third possible implementation manner, where the sending module is specifically configured to: send a first precoding matrix indicator $PMI_1$ and a second precoding matrix indicator $PMI_2$ to the base station, wherein the first precoding matrix indicator $PMI_1$ and the second precoding matrix indicator $PMI_2$ are respectively used to indicate indexes $i_1$ and $i_2$ corresponding to the selected precoding matrix.

Correspondingly, a fourth aspect of the present invention further provides a base station, where the base station includes:

a second sending module, configured to send a reference signal to a user equipment UE;

a second receiving module, configured to receive a precoding matrix indicator PMI sent by the UE, where the PMI is corresponding to a precoding matrix W that is selected by the UE from a codebook based on the reference signal, and a column vector of the precoding matrix W may be expressed as $\alpha[v \ e^{j\phi}v]^T$, $v=[1 \ e^{j\theta}]$, where $\alpha$ is a constant, $\theta$ and $\phi$ are phases, and $[\ ]^T$ indicates transposing of a matrix or vector.

With reference to the fourth aspect, in a first possible implementation manner, where the precoding matrix W is at least one matrix in the following matrix set:

$$\left\{ \frac{1}{\sqrt{12}}\begin{bmatrix} 1 & 1 & 1 \\ e^{j\theta} & e^{j\theta} & -e^{j\theta} \\ 1 & -1 & -1 \\ e^{j\theta} & -e^{j\theta} & e^{j\theta} \end{bmatrix}, \frac{1}{\sqrt{12}}\begin{bmatrix} 1 & 1 & 1 \\ -e^{j\theta} & e^{j\theta} & -e^{j\theta} \\ 1 & -1 & -1 \\ -e^{j\theta} & -e^{j\theta} & e^{j\theta} \end{bmatrix}, \right.$$

$$\left. \frac{1}{\sqrt{12}}\begin{bmatrix} 1 & 1 & 1 \\ e^{j\theta} & -e^{j\theta} & -e^{j\theta} \\ 1 & 1 & -1 \\ e^{j\theta} & -e^{j\theta} & e^{j\theta} \end{bmatrix}, \frac{1}{\sqrt{12}}\begin{bmatrix} 1 & 1 & 1 \\ -e^{j\theta} & e^{j\theta} & e^{j\theta} \\ 1 & 1 & -1 \\ -e^{j\theta} & e^{j\theta} & -e^{j\theta} \end{bmatrix} \right\} \text{ where}$$

$$\theta = \frac{\pi}{8}(4i_1 + 2\lfloor i_2/4 \rfloor), i_1 = 0, 1, 2, 3, i_2 = 0, \ldots, 15, \text{ and } \lfloor i_2/4 \rfloor$$

indicates the greatest integer not greater than $i_2/4$.

With reference to the fourth aspect, in a second possible implementation manner, where the precoding matrix W is at least one matrix in the following matrix set:

$$\left\{ \frac{1}{4}\begin{bmatrix} 1 & 1 & 1 & 1 \\ e^{j\theta} & -e^{j\theta} & e^{j\theta} & -e^{j\theta} \\ 1 & 1 & -1 & -1 \\ e^{j\theta} & -e^{j\theta} & -e^{j\theta} & e^{j\theta} \end{bmatrix}, \frac{1}{4}\begin{bmatrix} 1 & 1 & 1 & 1 \\ e^{j\theta} & -e^{j\theta} & e^{j\theta} & -e^{j\theta} \\ j & j & -j & -j \\ je^{j\theta} & -je^{j\theta} & -je^{j\theta} & je^{j\theta} \end{bmatrix} \right\} \text{ or}$$

$$\left\{ \frac{1}{4} \begin{bmatrix} 1 & 1 & 1 & 1 \\ e^{j\theta} & e^{j\theta} & -e^{j\theta} & -e^{j\theta} \\ 1 & -1 & 1 & -1 \\ e^{j\theta} & -e^{j\theta} & -e^{j\theta} & e^{j\theta} \end{bmatrix}, \frac{1}{4} \begin{bmatrix} 1 & 1 & 1 & 1 \\ e^{j\theta} & e^{j\theta} & -e^{j\theta} & -e^{j\theta} \\ j & -j & j & -j \\ je^{j\theta} & -je^{j\theta} & -je^{j\theta} & je^{j\theta} \end{bmatrix} \right\} \text{ where}$$

$$\theta = \frac{\pi}{8}(4i_1 + 2\lfloor i_2/2 \rfloor), i_1 = 0, 1, 2, 3, i_2 = 0, \ldots, 7, \text{ and } \lfloor i_2/2 \rfloor$$

indicates the greatest integer not greater than $i_2/2$.

With reference to the first or second implementation manner, in a third possible implementation manner, where the second receiving module is specifically configured to: receive a first precoding matrix indicator $PMI_1$ and a second precoding matrix indicator $PMI_2$ that are sent by a user equipment to the base station, wherein the first precoding matrix indicator $PMI_1$ and the second precoding matrix indicator $PMI_2$ are respectively used to indicate indexes $i_1$ and $i_2$ corresponding to the selected precoding matrix.

Correspondingly, another embodiment of the present invention provides a computer storage medium, where the computer storage medium may store a program, and when the program is executed, a step in the foregoing method embodiments is performed.

It can be learned from the foregoing embodiments of the present invention that, a user equipment may select a precoding matrix from a codebook based on a received reference signal, and send a precoding matrix indicator corresponding to the selected precoding matrix W to the base station, where the codebook includes at least one precoding matrix W, and a column vector of the precoding matrix W may be expressed as $\alpha[v \ e^{j\phi}v]^T$, $v=[1 \ e^{j\theta}]$, where $\alpha$ is a constant, $\theta$ and $\phi$ are phases, and $[ \ ]^T$ indicates transposing of a matrix or vector. The foregoing codebook structure may match actually deployed antenna configuration, for example, configuration of a four-port dual-polarized antenna or a uniform linear array antenna; phases $\theta$ and $\phi$ are flexibly selected, which cannot only further improve quantization precision as required, but also achieve balance between overheads and the quantization precision. In addition, column vectors of the precoding matrix W are orthogonal to each other, which further reduces inter-layer interference. After the user equipment feeds back the precoding matrix indicator corresponding to the precoding matrix W to the base station, the base station performs precoding on a sent signal according to the fed back precoding matrix indicator, which can improve precoding precision, thereby improving a data transmission rate and system throughput.

BRIEF DESCRIPTION OF DRAWINGS

To describe the technical solutions in the embodiments of the present invention more clearly, the following briefly introduces the accompanying drawings required for describing the prior art or the embodiments. Apparently, the accompanying drawings in the following description show merely some embodiments of the present invention, and a person skilled in the art may still derive other drawings from these accompanying drawings.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person skilled in the art based on the embodiments of the present invention shall fall within the protection scope of the present invention.

Figure 1:
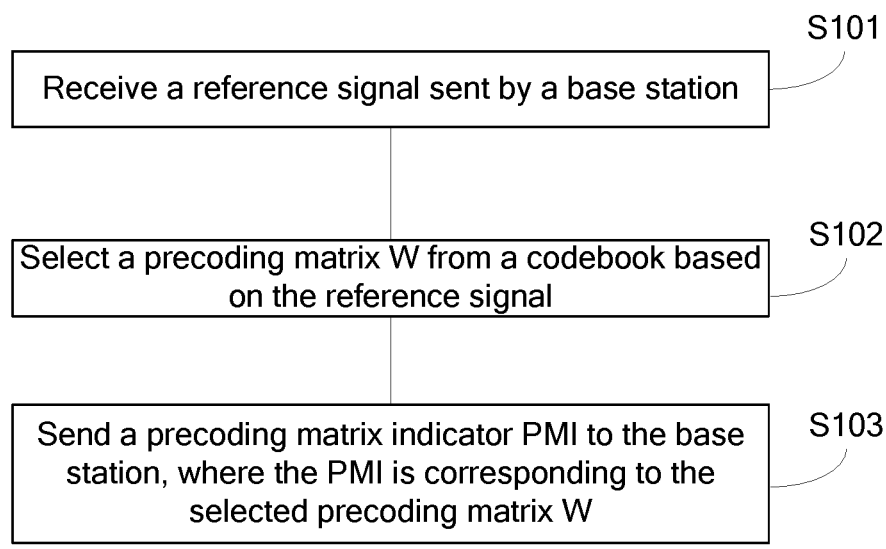
FIG. 1 is a schematic flowchart of a method for feeding back channel state information according to an embodiment of the present invention.

Referring to FIG. 1, FIG. 1 is a schematic flowchart of a method for feeding back channel state information according to an embodiment of the present invention, and an execution body of the method may be a user equipment (UE) of an LTE system, for example, may be a user equipment (UE), a mobile station (MS), or a relay (hereinafter referred to as a UE).

The following describes the method illustrated in FIG. 1, which mainly includes step S101, step S102, and step S103.

Step S101: Receive a reference signal sent by a base station.

In this embodiment of the present invention, the reference signal sent by the base station may include a channel state information reference signal (CSI RS), a demodulation reference signal (DM RS), a cell-specific reference signal (CRS), or the like. The user equipment may obtain the reference signal by receiving an eNB notification, for example, by receiving radio resource control (RRC) signaling or downlink control information (DCI); or the user equipment obtains resource configuration of the reference signal based on a cell identity ID and then obtains the reference signal from a corresponding resource or subframe. This embodiment of the present invention sets no limitation on a specific manner of receiving a reference signal.

It should be understood that the foregoing reference signal is corresponding to an antenna port; the reference signal may be corresponding to a physical antenna or an antenna array element, or may be corresponding to a virtual antenna, where the virtual antenna is a weighted combination of a physical antenna and an antenna array element.

Step S102: Select a precoding matrix W from a codebook based on the reference signal, where a column vector of the precoding matrix W may be expressed as $\alpha[v \ e^{j\phi}v]^T$, $v=[1 \ e^{j\theta}]$, where $\alpha$ is a constant, $\theta$ and $\phi$ are phases, and $[ \ ]^T$ indicates transposing of a matrix or vector.

Specifically, values of phases $\theta$ and $\phi$ may be flexibly selected according to a requirement of quantization precision.

Further, column vectors of the precoding matrix W may be orthogonal to each other, that is, W meets $W^H W = \alpha^2 I$, where $W^H$ indicates a conjugate transpose of the matrix W, and I is an identity matrix. The foregoing structure divides antenna ports into two groups; a vector v may match channel characteristics corresponding to each antenna group of the two groups, and a phase between the two antenna port groups may be expressed by $\phi$. The foregoing structure may match actually deployed antenna configuration, for example, configuration of a four-port dual-polarized antenna or a uniform linear array antenna. Phases θ and φ are flexibly selected, which cannot only further improve quantization precision as required, but also achieve balance between overheads and the quantization precision. Column vectors of the precoding matrix W are orthogonal to each other, which further reduces inter-layer interference, thereby improving a transmission rate and spectral efficiency of a system.

It should be noted that, a codebook in this embodiment of the present invention may be a codebook subset. The codebook subset may be predefined; the codebook subset may be reported by a user equipment to a base station (eNB), and then the base station (eNB) determines the codebook subset based on reporting of the user equipment and notifies the user equipment of the determined codebook subset; or the codebook subset may be a codebook subset determined and reported by a user equipment, for example, a recently reported codebook subset.

Specifically, in step 102, the selecting a precoding matrix from a codebook based on the reference signal may include: acquiring, by a UE, a channel estimation value based on the reference signal; and selecting, by the UE, a precoding matrix from a codebook based on the channel estimation value.

It should be noted that, this embodiment of the present invention sets no limitation on a specific manner of selecting a precoding matrix. Optionally, a precoding matrix is selected from the codebook according to a predefined criterion, such as a criterion of channel capacity or throughput maximization, or a criterion of chordal distance minimization. Selecting a precoding matrix based on a predefined criterion is an existing technology, and details are not described herein again.

As an embodiment of the present invention, the precoding matrix W is at least one matrix in the following matrix set:

$$\left\{\frac{1}{2}\begin{bmatrix}1\\e^{j\theta}\\1\\e^{j\theta}\end{bmatrix}, \frac{1}{2}\begin{bmatrix}1\\e^{j\theta}\\j\\e^{j\theta}\end{bmatrix}, \frac{1}{2}\begin{bmatrix}1\\e^{j\theta}\\-1\\-e^{j\theta}\end{bmatrix}, \frac{1}{2}\begin{bmatrix}1\\e^{j\theta}\\-j\\-je^{j\theta}\end{bmatrix}\right\} \text{ where} \quad (1)$$

$$\theta = \frac{\pi}{16}(2i_1 + \lfloor i_2/4 \rfloor), i_1 = 0, \ldots, 15, i_2 = 0, \ldots, 15, \text{ and } \lfloor i_2/4 \rfloor$$

indicates that its value is the greatest integer not greater than $i_2/4$.

It can be learned from investigation on the matrix set (1) to which the foregoing precoding matrix W belongs that, the foregoing precoding matrix W may match actually deployed antenna configuration. In addition, a granularity of a value of θ is $$\frac{\pi}{16},$$

which may achieve more precise spatial quantization, and therefore feedback precision of CSI can be improved.

As another embodiment of the present invention, the precoding matrix W is at least one matrix in the following matrix set:

$$\left\{\frac{1}{\sqrt{8}}\begin{bmatrix}1 & 1\\e^{j\theta} & e^{j\theta}\\1 & -1\\e^{j\theta} & -e^{j\theta}\end{bmatrix}, \frac{1}{\sqrt{8}}\begin{bmatrix}1 & 1\\e^{j\theta} & e^{j\theta}\\j & -j\\je^{j\theta} & -je^{j\theta}\end{bmatrix}\right\} \text{ or} \quad (2)$$

$$\left\{\frac{1}{\sqrt{8}}\begin{bmatrix}1 & 1\\e^{j\theta} & e^{j(\theta+\varphi)}\\1 & -1\\e^{j\theta} & -e^{j(\theta+\varphi)}\end{bmatrix}, \frac{1}{\sqrt{8}}\begin{bmatrix}1 & 1\\e^{j\theta} & e^{j(\theta+\varphi)}\\j & -j\\je^{j\theta} & -je^{j(\theta+\varphi)}\end{bmatrix}\right\} \text{ where} \quad (2')$$

$$\theta = \frac{\pi}{16}(2i_1 + \lfloor i_2/4 \rfloor), i_1 = 0, \ldots, 15,$$

$$i_2 = 0, \ldots, 15, \varphi = \frac{\pi}{16}, \frac{\pi}{8}, \ldots, \text{ and } \lfloor i_2/4 \rfloor$$

indicates that its value is the greatest integer not greater than $i_2/4$.

It can be learned from investigation on the matrix set (2) or (2') to which the foregoing precoding matrix W belongs that, the foregoing precoding matrix W may match actually deployed antenna configuration. Because a granularity of a value of θ is $$\frac{\pi}{16},$$

more precise spatial quantization is achieved, and feedback precision of CSI can be improved. In addition, two columns of the precoding matrix W are orthogonal to each other, which can reduce inter-layer interference.

As another embodiment of the present invention, the precoding matrix W is at least one matrix in the following matrix set:

$$\left\{\frac{1}{\sqrt{12}}\begin{bmatrix}1 & 1 & 1\\e^{j\theta} & e^{j\theta} & -e^{j\theta}\\1 & -1 & -1\\e^{j\theta} & -e^{j\theta} & e^{j\theta}\end{bmatrix}, \frac{1}{\sqrt{12}}\begin{bmatrix}1 & 1 & 1\\-e^{j\theta} & e^{j\theta} & -e^{j\theta}\\1 & -1 & -1\\-e^{j\theta} & -e^{j\theta} & e^{j\theta}\end{bmatrix}, \frac{1}{\sqrt{12}}\begin{bmatrix}1 & 1 & 1\\e^{j\theta} & -e^{j\theta} & -e^{j\theta}\\1 & 1 & -1\\e^{j\theta} & -e^{j\theta} & e^{j\theta}\end{bmatrix}, \frac{1}{\sqrt{12}}\begin{bmatrix}1 & 1 & 1\\-e^{j\theta} & e^{j\theta} & e^{j\theta}\\1 & 1 & -1\\-e^{j\theta} & e^{j\theta} & -e^{j\theta}\end{bmatrix}\right\} \text{ where} \quad (3)$$

$$\theta = \frac{\pi}{8}(4i_1 + 2\lfloor i_2/4 \rfloor), i_1 = 0, 1, 2, 3, i_2 = 0, \ldots, 15, \text{ and } \lfloor i_2/4 \rfloor$$

indicates that its value is the greatest integer not greater than $i_2/4$.

Similarly, it can be learned from investigation on the matrix set (3) to which the foregoing precoding matrix W belongs that, the foregoing precoding matrix W may match actually deployed antenna configuration. Because a granularity of a value of θ is $$\frac{\pi}{16},$$

more precise spatial quantization is achieved, and feedback precision of CSI can be improved. In addition, two columns of the precoding matrix W are orthogonal to each other, which can reduce inter-layer interference.

As another embodiment of the present invention, the precoding matrix W is at least one matrix in the following matrix set:

$$\left\{ \frac{1}{4}\begin{bmatrix} 1 & 1 & 1 & 1 \\ e^{j\theta} & -e^{j\theta} & e^{j\theta} & -e^{j\theta} \\ 1 & 1 & -1 & -1 \\ e^{j\theta} & -e^{j\theta} & -e^{j\theta} & e^{j\theta} \end{bmatrix}, \frac{1}{4}\begin{bmatrix} 1 & 1 & 1 & 1 \\ e^{j\theta} & -e^{j\theta} & e^{j\theta} & -e^{j\theta} \\ j & j & -j & -j \\ je^{j\theta} & -je^{j\theta} & -je^{j\theta} & je^{j\theta} \end{bmatrix} \right\} \text{ or} \quad (4)$$

$$\left\{ \frac{1}{4}\begin{bmatrix} 1 & 1 & 1 & 1 \\ e^{j\theta} & e^{j\theta} & -e^{j\theta} & -e^{j\theta} \\ 1 & -1 & 1 & -1 \\ e^{j\theta} & -e^{j\theta} & -e^{j\theta} & e^{j\theta} \end{bmatrix}, \frac{1}{4}\begin{bmatrix} 1 & 1 & 1 & 1 \\ e^{j\theta} & e^{j\theta} & -e^{j\theta} & -e^{j\theta} \\ j & -j & j & -j \\ je^{j\theta} & -je^{j\theta} & -je^{j\theta} & je^{j\theta} \end{bmatrix} \right\} \text{ where} \quad (5)$$

$$\theta = \frac{\pi}{8}(4i_1 + 2\lfloor i_2/2 \rfloor), i_1 = 0, 1, 2, 3, i_2 = 0, \ldots, 7, \text{ and } \lfloor i_2/2 \rfloor$$

indicates that its value is the greatest integer not greater than $i_2/2$.

Similarly, it can be learned from investigation on the matrix set (4) or (5) to which the foregoing precoding matrix W belongs that, the foregoing precoding matrix W may match actually deployed antenna configuration. Because a granularity of a value of θ is $$\frac{\pi}{4},$$

more precise spatial quantization is achieved, and feedback precision of CSI can be improved. In addition, two columns of the precoding matrix W are orthogonal to each other, which can reduce inter-layer interference.

Step S103: Send a precoding matrix indicator PMI to the base station, where the PMI is corresponding to the selected precoding matrix W.

In this embodiment of the present invention, the precoding matrix indicator PMI may include only one specific value, and the PMI directly indicates the selected precoding matrix. For example, altogether 256 different precoding matrices may be selected from the matrix set (1) or (2), and then PMI=0, . . . , 255 may be used to respectively indicate the precoding matrices whose index values are 0, 1, . . . , 255. Therefore, as an embodiment of the present invention in which a precoding matrix indicator PMI is sent to the base station and the PMI is corresponding to the selected precoding matrix, the precoding matrix indicator PMI may be an index value corresponding to a precoding matrix W in a codebook. Because a base station side also has the codebook, the base station may obtain, according to the PMI, a precoding matrix selected by a UE from the codebook.

According to another aspect, because the index values $i_1$ and $i_2$ can uniquely determine a precoding matrix W, as another embodiment of the present invention in which a precoding matrix indicator PMI is sent to the base station and the PMI is corresponding to the selected precoding matrix, a first precoding matrix indicator $PMI_1$ and a second precoding matrix indicator $PMI_2$ may be sent to the base station, and are respectively corresponding to the index values $i_1$ and $i_2$ that are associated with the selected precoding matrix. Because a base station side also has the codebook, the base station may obtain, according to the first precoding matrix indicator $PMI_1$ and the second precoding matrix indicator $PMI_2$, a precoding matrix selected by a UE from the codebook. For ease of the following description, a precoding matrix indicator $PMI_1$ and a precoding matrix indicator $PMI_2$ are respectively used to indicate corresponding precoding matrix indicators indicated by $i_1$ and $i_2$. In this embodiment of the present invention, the $PMI_1$ and the $PMI_2$ have different time domain or frequency domain granularities, or are obtained based on different subframe periods or sub-band sizes. For example, the precoding matrix indicator $PMI_1$ and the precoding matrix indicator $PMI_2$ respectively indicate channel characteristics with different periods or bandwidth, or are obtained based on different subframe periods or sub-band sizes. Further, the precoding matrix indicator $PMI_1$ and the precoding matrix indicator $PMI_2$ are sent to the base station in different time periods.

When a precoding matrix indicator PMI is sent to a base station, the precoding matrix indicator PMI may be sent to the base station by a user equipment through a physical uplink control channel (PUCCH) or a physical uplink shared channel (PUSCH). It should be noted that, the precoding matrix W in this embodiment of the present invention may be a precoding matrix obtained after row or column permutation. For example, different antenna numbers correspondingly lead to row permutation of the precoding matrix.

It can be learned from the foregoing method for feeding back channel state information according to this embodiment of the present invention that, a user equipment may select a precoding matrix from a codebook based on a received reference signal, and send a precoding matrix indicator corresponding to the selected precoding matrix to the base station. The codebook includes at least one precoding matrix W, and a column vector of the precoding matrix W may be expressed as $\alpha[v \; e^{j\phi}v]^T$, $v=[1 \; e^{j\theta}]$, where α is a constant, θ and φ are phases, and $[\;]^T$ indicates transposing of a matrix or vector. The foregoing codebook structure may match actually deployed antenna configuration, for example, configuration of a four-port dual-polarized antenna or a uniform linear array antenna; phases θ and φ are flexibly selected, which cannot only further improve quantization precision as required, but also achieve balance between overheads and the quantization precision. In addition, column vectors of the precoding matrix W are orthogonal to each other, which further reduces inter-layer interference. After the user equipment feeds back the precoding matrix indicator corresponding to the precoding matrix W to the base station, the base station performs precoding on a sent signal according to the fed back precoding matrix indicator, which improves system throughput.

Figure 2:
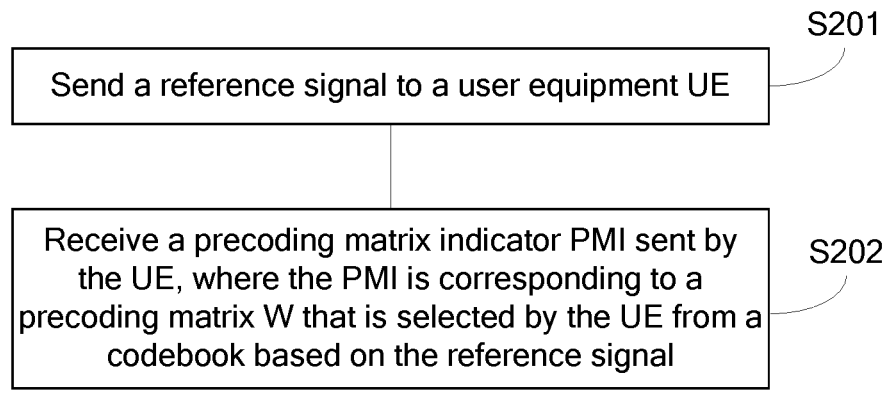
FIG. 2 is a schematic flowchart of a method for feeding back channel state information according to another embodiment of the present invention.

With reference to FIG. 1, the foregoing embodiment describes in detail a method for feeding back channel state information according to the embodiment of the present invention from a perspective of a UE; with reference to FIG. 2, the following describes a method for feeding back channel state information according to an embodiment of the present invention from a perspective of a base station.

FIG. 2 is a method for feeding back channel state information according to another embodiment of the present invention. The method in FIG. 2 is implemented by a base station, which, for example, may be a node B (NodeB), an access point (AP), a transmission point (TP), an evolved node B (eNB), or a relay.

It should be understood that description about a UE side in interaction between a UE and a base station, and related characteristics and functions of the UE and the base station is corresponding to description about a base station side. For brevity, details are not described herein again.

The following describes a method illustrated in FIG. 2, which mainly includes step S201 and step S202. Detailed description is as follows:

Step S201: Send a reference signal to a user equipment UE.

Specifically, the reference signal may include a CSI RS, a DM RS, a CRS, or the like. The base station may instruct the UE to receive the reference signal through higher layer signaling such as RRC signaling or downlink control information DCI; or the base station sends the reference signal over a resource or a subframe of a corresponding reference signal based on a cell identity ID. This embodiment of the present invention sets no limitation on a specific manner of sending a reference signal.

Step S202: Receive a precoding matrix indicator PMI sent by the UE, where the PMI is corresponding to a precoding matrix W that is selected by the UE from a codebook based on the reference signal, and a column vector of the precoding matrix W may be expressed as $\alpha[v \ e^{j\Phi}v]^T$, $v=[1 \ e^{j\theta}]$, where $\alpha$ is a constant, $\theta$ and $\phi$ are phases, and $[\ ]^T$ indicates transposing of a matrix or vector.

Specifically, values of phases $\theta$ and $\phi$ may be flexibly selected according to a requirement of quantization precision.

Further, column vectors of the precoding matrix W may be orthogonal to each other, that is, W meets $W^H W = \alpha 2I$ where $W^H$ indicates a conjugate transpose of the matrix W, and I is an identity matrix. The foregoing structure divides antenna ports into two groups; a vector v may match channel characteristics corresponding to each antenna group of the two groups, and a phase between the two antenna port groups may be expressed by $\phi$.

As an embodiment of the present invention, the precoding matrix W is at least one matrix in the matrix set shown in the expression (1), where $$\theta = \frac{\pi}{16}(2i_1 + \lfloor i_2/4 \rfloor), i_1 = 0, \ldots, 15, i_2 = 0, \ldots, 15, \text{ and } \lfloor i_2/4 \rfloor$$

indicates that its value is the greatest integer not greater than $i_2/4$.

As another embodiment of the present invention, the precoding matrix W is at least one matrix in the matrix set shown in the expression (2) or (2'), where $$\theta = \frac{\pi}{16}(2i_1 + \lfloor i_2/4 \rfloor), i_1 = 0, \ldots, 15,$$

$$i_2 = 0, \ldots, 15, \varphi = \frac{\pi}{16}, \frac{\pi}{8}, \ldots, \text{ and } \lfloor i_2/4 \rfloor$$

indicates that its value is the greatest integer not greater than $i_2/4$.

As another embodiment of the present invention, the precoding matrix W is at least one matrix in the matrix set shown in the expression (3), where $$\theta = \frac{\pi}{8}(4i_1 + 2\lfloor i_2/4 \rfloor), i_1 = 0, 1, 2, 3, i_2 = 0, \ldots, 15, \text{ and } \lfloor i_2/4 \rfloor$$

indicates that its value is the greatest integer not greater than $i_2/4$.

As another embodiment of the present invention, the precoding matrix W is at least one matrix in the matrix set shown in the expression (4) or (5), where $$\theta = \frac{\pi}{8}(4i_1 + 2\lfloor i_2/2 \rfloor), i_1 = 0, 1, 2, 3, i_2 = 0, \ldots, 7, \text{ and } \lfloor i_2/2 \rfloor$$

indicates that its value is the greatest integer not greater than $i_2/2$.

It can be learned from investigation on the foregoing precoding matrix W that, the foregoing matrix structure may match actually deployed antenna configuration, for example, configuration of a four-port dual-polarized antenna or a uniform linear array antenna. Phases $\theta$ and $\phi$ are flexibly selected, which cannot only further improve quantization precision as required, but also achieve balance between overheads and the quantization precision. Column vectors of the precoding matrix W are orthogonal to each other, which further reduces inter-layer interference, thereby improving a transmission rate and spectral efficiency of a system.

The codebook is known to both the base station and the UE. As another embodiment of the present invention, the precoding matrix indicator PMI may include only one specific value, and the PMI directly indicates the selected precoding matrix. For example, altogether 256 different precoding matrices may be selected from the matrix set (1) or (2), and then PMI=0, ..., 255 may be used to respectively indicate the precoding matrices whose index values are 0, 1, ..., 255. In this case, the base station may obtain, according to the PMI, the precoding matrix selected by the UE from the codebook.

As another embodiment of the present invention, the precoding matrix indicator PMI may include two indexes, that is, a first precoding matrix indicator $PMI_1$ and a second precoding matrix indicator $PMI_2$, where the $PMI_1$ and the $PMI_2$ are respectively corresponding to index values $i_1$ and $i_2$ that are associated with the selected precoding matrix. The base station may obtain, according to the $PMI_1$ and the $PMI_2$, the precoding matrix selected by the UE from the codebook.

When a precoding matrix indicator PMI sent by a user equipment UE is received, the PMI may be received by a base station through a PUCCH or a PUSCH. It should be noted that, the precoding matrix W in this embodiment of the present invention may be a precoding matrix obtained after row or column permutation. For example, different antenna numbers correspondingly lead to row permutation of the precoding matrix.

It can be learned from the foregoing method for feeding back channel state information according to this embodiment of the present invention that, a base station sends a reference signal and receives a precoding matrix indicator PMI sent by a UE, where the PMI is corresponding to a precoding matrix that is selected by the UE from a codebook based on the reference signal. The codebook includes at least one precoding matrix W, and a column vector of the precoding matrix W may be expressed as $\alpha[v \ e^{j\Phi}v]^T$, $v=[1 \ e^{j\theta}]$, where $\alpha$ is a constant, $\theta$ and $\phi$ are phases, and $[\ ]^T$ indicates transposing of a matrix or vector. The foregoing codebook structure may match actually deployed antenna configuration, for example, configuration of a four-port dual-polarized antenna or a uniform linear array antenna; phases $\theta$ and $\phi$ are flexibly selected, which cannot only further improve quantization precision as required, but also achieve balance between overheads and the quantization precision. In addition, column vectors of the precoding matrix W are orthogonal to each other, which further reduces inter-layer interference. After the user equipment feeds back the precoding matrix indicator corresponding to the precoding matrix W to the base station, the base station performs precoding on a sent signal according to the fed back precoding matrix indicator, which improves system throughput.

Figure 3:
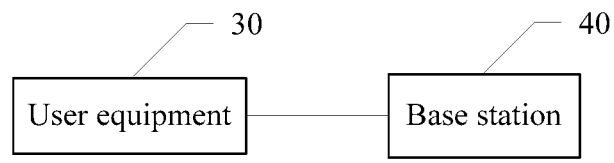
FIG. 3 is a schematic structural diagram of a system for feeding back channel state information according to an embodiment of the present invention.

The following describes in detail a system for feeding back channel state information, a user equipment, and a base station according to the present invention. Referring to FIG. 3, FIG. 3 is a schematic diagram of structural composition of a system for feeding back channel state information according to an embodiment of the present invention. The system according to this embodiment of the present invention includes a user equipment 30 and a base station 40. A structure of the user equipment 30 is shown in FIG. 4, and a structure of the base station 40 is shown in FIG. 5.

Figure 4:
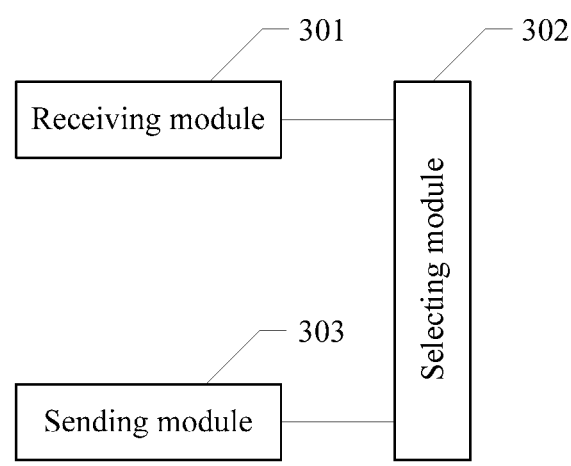
FIG. 4 is a schematic structural diagram of a user equipment according to an embodiment of the present invention.
Figure 5:
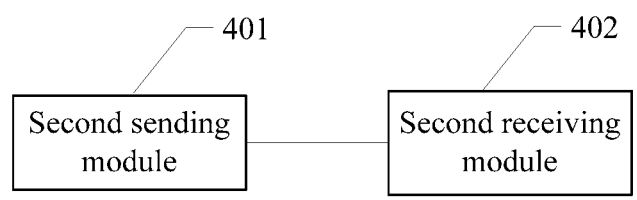
FIG. 5 is a schematic structural diagram of a base station according to an embodiment of the present invention.

Referring to FIG. 4, FIG. 4 is a schematic structural diagram of the user equipment 30 according to the embodiment of the present invention, and the user equipment 30 includes a receiving module 301, a selecting module 302, and a sending module 303, where the receiving module 301 may be implemented by a receiver in the user equipment 30 or a software module/unit or a hardware module/unit of the receiver of the user equipment 30, the selecting module 302 may be implemented by a processor in the user equipment 30 or a software module/unit or a hardware module/unit of the processor of the user equipment 30, and the sending module 303 may be implemented by a transmitter in the user equipment 30 or a software module/unit or a hardware module/unit of the transmitter of the user equipment 30.

The receiving module 301 is configured to receive a reference signal sent by a base station. The reference signal sent by the base station may include a channel state information reference signal (CSI RS), a demodulation reference signal (DM RS), a cell-specific reference signal (CRS), or the like. The user equipment may obtain the reference signal by receiving an eNB notification, for example, by receiving radio resource control (RRC) signaling or downlink control information (DCI); or the user equipment obtains resource configuration of the reference signal based on a cell identity ID and then obtains the reference signal from a corresponding resource or subframe. This embodiment of the present invention sets no limitation on a specific manner of receiving a reference signal.

It should be understood that the foregoing reference signal is corresponding to an antenna port; the reference signal may be corresponding to a physical antenna or an antenna array element, or may be corresponding to a virtual antenna, where the virtual antenna is a weighted combination of a physical antenna and an antenna array element.

The selecting module 302 is configured to select a precoding matrix W from a codebook based on the reference signal received by the receiving module 301, where a column vector of the precoding matrix W may be expressed as $\alpha[v\ e^{j\phi}v]^T$, $v=[1\ e^{j\theta}]$, where $\alpha$ is a constant, $\theta$ and $\phi$ are phases, and $[\ ]^T$ indicates transposing of a matrix or vector.

Specifically, values of phases $\theta$ and $\phi$ may be flexibly selected according to a requirement of quantization precision.

Further, column vectors of the precoding matrix W may be orthogonal to each other, that is, W meets $W^H W = \alpha^2 I$, where $W^H$ indicates a conjugate transpose of the matrix W, and I is an identity matrix. The foregoing structure divides antenna ports into two groups; a vector v may match channel characteristics corresponding to each antenna group of the two groups, and a phase between the two antenna port groups may be expressed by $\phi$. The foregoing structure may match actually deployed antenna configuration, for example, configuration of a four-port dual-polarized antenna or a uniform linear array antenna. Phases $\theta$ and $\phi$ are flexibly selected, which cannot only further improve quantization precision as required, but also achieve balance between overheads and the quantization precision. Column vectors of the precoding matrix W are orthogonal to each other, which further reduces inter-layer interference, thereby improving a transmission rate and spectral efficiency of a system.

It can be learned from the foregoing embodiment of the present invention that, a user equipment may select a precoding matrix from a codebook based on a received reference signal, and send a precoding matrix indicator corresponding to the selected precoding matrix W to a base station, where the codebook includes at least one precoding matrix W, and a column vector of the precoding matrix W may be expressed as $\alpha[v\ e^{j\phi}v]^T$, $v=[1\ e^{j\theta}]$, where $\alpha$ is a constant, $\theta$ and $\phi$ are phases, and $[\ ]^T$ indicates transposing of a matrix or vector. The foregoing codebook structure may match actually deployed antenna configuration, for example, configuration of a four-port dual-polarized antenna or a uniform linear array antenna; phases $\theta$ and $\phi$ are flexibly selected, which cannot only further improve quantization precision as required, but also achieve balance between overheads and the quantization precision. In addition, column vectors of the precoding matrix W are orthogonal to each other, which further reduces inter-layer interference. After the user equipment feeds back the precoding matrix indicator corresponding to the precoding matrix W to the base station, the base station performs precoding on a sent signal according to the fed back precoding matrix indicator, which can improve precoding precision, thereby improving a data transmission rate and system throughput.

The selecting module 302 shown in FIG. 4 may be specifically configured to acquire a channel estimation value based on the reference signal, and select a precoding matrix from a codebook according to the channel estimation value.

It should be noted that, this embodiment of the present invention sets no limitation on a specific manner of selecting a precoding matrix. Optionally, a precoding matrix is selected from the codebook according to a predefined criterion, such as a criterion of channel capacity or throughput maximization, or a criterion of chordal distance minimization. Selecting a precoding matrix based on a predefined criterion is an existing technology, and details are not described herein again.

As an embodiment of the present invention, the precoding matrix W is at least one matrix in the matrix set shown in the expression (1), where $$\theta = \frac{\pi}{16}(2i_1 + \lfloor i_2/4 \rfloor),\ i_1 = 0, \ldots, 15,\ i_2 = 0, \ldots, 15,\ \text{and}\ \lfloor i_2/4 \rfloor$$

indicates that its value is the greatest integer not greater than $i_2/4$.

As another embodiment of the present invention, the precoding matrix W is at least one matrix in the matrix set shown in the expression (2) or (2'), where $$\theta = \frac{\pi}{16}(2i_1 + \lfloor i_2/4 \rfloor),\ i_1 = 0, \ldots, 15,$$

$$i_2 = 0, \ldots, 15,\ \varphi = \frac{\pi}{16}, \frac{\pi}{8}, \ldots,\ \text{and}\ \lfloor i_2/4 \rfloor$$

indicates that its value is the greatest integer not greater than $\lfloor i_2/4 \rfloor$.

As another embodiment of the present invention, the precoding matrix W is at least one matrix in the matrix set shown in the expression (3), where $$\theta = \frac{\pi}{8}(4i_1 + 2\lfloor i_2/4 \rfloor), i_1 = 0, 1, 2, 3, i_2 = 0, \ldots, 15, \text{ and } \lfloor i_2/4 \rfloor$$

indicates that its value is the greatest integer not greater than $i_2/4$.

As another embodiment of the present invention, the precoding matrix W is at least one matrix in the matrix set shown in the expression (4) or (5), where $$\theta = \frac{\pi}{8}(4i_1 + 2\lfloor i_2/4 \rfloor), i_1 = 0, 1, 2, 3, i_2 = 0, \ldots, 7, \text{ and } \lfloor i_2/2 \rfloor$$

indicates that its value is the greatest integer not greater than $i_2/2$.

It can be learned from investigation on the foregoing precoding matrix W that, the foregoing matrix structure may match actually deployed antenna configuration, for example, configuration of a four-port dual-polarized antenna or a uniform linear array antenna. Phases θ and φ are flexibly selected, which cannot only further improve quantization precision as required, but also achieve balance between overheads and the quantization precision. Column vectors of the precoding matrix W are orthogonal to each other, which further reduces inter-layer interference, thereby improving a transmission rate and spectral efficiency of a system.

The sending module 303 is configured to send a precoding matrix indicator PMI to the base station, where the PMI is corresponding to the precoding matrix W selected by the selecting module 302. The user equipment may send the precoding matrix indicator PMI to the base station through a PUCCH or a PUSCH.

As an embodiment of the present invention, the precoding matrix indicator PMI may include only one specific value, and the PMI directly indicates the selected precoding matrix. For example, altogether 256 different precoding matrices may be selected from the matrix set (1) or (2), and then PMI=0, . . . , 255 may be used to respectively indicate the precoding matrices whose index values are 0, 1, . . . , 255. Therefore, as an embodiment of the present invention in which a precoding matrix indicator PMI is sent to the base station and the PMI is corresponding to the selected precoding matrix, the precoding matrix indicator PMI may be an index value corresponding to a precoding matrix W in a codebook. Because a base station side also has the codebook, the base station may obtain, according to the PMI, the precoding matrix selected by the UE from the codebook.

As another embodiment of the present invention, the precoding matrix indicator PMI may include two indexes, that is, a first precoding matrix indicator $PMI_1$ and a second precoding matrix indicator $PMI_2$, where the $PMI_1$ and the $PMI_2$ are respectively corresponding to index values $i_1$ and $i_2$ that are associated with the selected precoding matrix. The base station may obtain, according to the first precoding matrix indicator $PMI_1$ and the second precoding matrix indicator $PMI_2$, the precoding matrix selected by the UE from the codebook.

In this embodiment of the present invention, the $PMI_1$ and the $PMI_2$ have different time domain or frequency domain granularities, or are obtained based on different subframe periods or sub-band sizes. For example, the precoding matrix indicator $PMI_1$ and the precoding matrix indicator $PMI_2$ respectively indicate channel characteristics with different periods or bandwidth, or are obtained based on different subframe periods or sub-band sizes. Further, the precoding matrix indicator $PMI_1$ and the precoding matrix indicator $PMI_2$ are sent to the base station in different time periods.

When a precoding matrix indicator PMI is sent to a base station, the precoding matrix indicator PMI may be sent to the base station by a user equipment through a PUCCH or a PUSCH. It should be noted that, the precoding matrix W in this embodiment of the present invention may be a precoding matrix obtained after row or column permutation. For example, different antenna numbers correspondingly lead to row permutation of the precoding matrix.

It can be learned from the foregoing user equipment according to this embodiment of the present invention that, the user equipment may select a precoding matrix from a codebook based on a received reference signal, and send a precoding matrix indicator corresponding to the selected precoding matrix to a base station. The codebook includes at least one precoding matrix W, and a column vector of the precoding matrix W may be expressed as $\alpha[v \ e^{j\phi}v]^T$, $v=[1 \ e^{j\theta}]$, where α is a constant, θ and φ are phases, and $[\ ]^T$ indicates transposing of a matrix or vector.

The foregoing codebook structure may match actually deployed antenna configuration, for example, configuration of a four-port dual-polarized antenna or a uniform linear array antenna; phases θ and φ are flexibly selected, which cannot only further improve quantization precision as required, but also achieve balance between overheads and the quantization precision. In addition, column vectors of the precoding matrix W are orthogonal to each other, which further reduces inter-layer interference. After the user equipment feeds back the precoding matrix indicator corresponding to the precoding matrix W to the base station, the base station performs precoding on a sent signal according to the fed back precoding matrix indicator, which improves system throughput.

It should be noted that, in the foregoing implementation manner of the user equipment, division of functional modules is merely used as an example, and the foregoing functions may be allocated to different functional modules according to an actual requirement, for example, according to a corresponding hardware configuration requirement or for ease of software implementation; that is, an internal structure of the user equipment is divided into different functional modules, to complete all or some of the functions described above. In addition, in an actual application, corresponding functional modules in this embodiment may be implemented by corresponding hardware, or may be implemented by corresponding hardware by implementing corresponding software. For example, the foregoing receiving module may be hardware that has a function of implementing the foregoing receiving a reference signal sent by a base station, such as a receiver, or may be a universal processor or another hardware device that can execute a corresponding computer program to complete the foregoing functions. For another example, the foregoing selecting module may be hardware that has a function of executing the foregoing selecting a precoding matrix W from a codebook based on a reference signal received by the receiving module (or receiver), such as a precoding matrix determiner, or may be a universal processor or another hardware device that can execute a corresponding computer program to complete the foregoing functions. (The principle of the foregoing description may be applicable to each embodiment provided in this specification.)

Referring to FIG. 5, FIG. 5 is a schematic structural diagram of a base station according to an embodiment of the present invention. The base station includes a second sending module 401 and a second receiving module 402, where the second sending module 401 may be implemented by a transmitter in a base station 40 or a software module/unit or a hardware module/unit of the transmitter in the base station 40; the second receiving module 402 may be implemented by a receiver in the base station 40 or a software module/unit or a hardware module/unit of the receiver in the base station 40; or the second sending module 401 and the second receiving module 402 may be implemented by a processor in the base station 40 or a software module/unit or a hardware module/unit of the processor in the base station 40.

The second sending module 401 is configured to send a reference signal to a user equipment UE.

Specifically, the reference signal may include a CSI RS, a DM RS, a CRS, or the like. The base station may instruct the UE to receive the reference signal through higher layer signaling such as RRC signaling or downlink control information DCI; or the base station sends the reference signal over a resource or a subframe of a corresponding reference signal based on a cell identity ID. This embodiment of the present invention sets no limitation on a specific manner of sending a reference signal.

It should be understood that the foregoing reference signal is corresponding to an antenna port; the reference signal may be corresponding to a physical antenna or an antenna array element, or may be corresponding to a virtual antenna, where the virtual antenna is a weighted combination of a physical antenna and an antenna array element.

The second receiving module 402 is configured to receive a precoding matrix indicator PMI sent by the user equipment UE, where the PMI is corresponding to a precoding matrix W that is selected by the UE from a codebook based on the reference signal, and a column vector of the precoding matrix W may be expressed as $\alpha[v\ e^{j\Phi}v]^T$, $v=[1\ e^{j\Theta}]$, where $\alpha$ is a constant, $\theta$ and $\phi$ are phases, and $[\ ]^T$ indicates transposing of a matrix or vector.

Specifically, values of phases $\theta$ and $\phi$ may be flexibly selected according to a requirement of quantization precision.

Further, column vectors of the precoding matrix W may be orthogonal to each other, that is, W meets $W^H W = \alpha^2 I$, where $W^H$ indicates a conjugate transpose of the matrix W, and I is an identity matrix. The foregoing structure divides antenna ports into two groups; a vector v may match channel characteristics corresponding to each antenna group of the two groups, and a phase between the two antenna port groups may be expressed by $\phi$. The foregoing structure may match actually deployed antenna configuration, for example, configuration of a four-port dual-polarized antenna or a uniform linear array antenna. Phases $\theta$ and $\phi$ are flexibly selected, which cannot only further improve quantization precision as required, but also achieve balance between overheads and the quantization precision. Column vectors of the precoding matrix W are orthogonal to each other, which further reduces inter-layer interference, thereby improving a transmission rate and spectral efficiency of a system.

As an embodiment of the present invention, the precoding matrix W is at least one matrix in the matrix set shown in the expression (1), where $$\theta = \frac{\pi}{16}(2i_1 + \lfloor i_2/4 \rfloor), i_1 = 0, \ldots, 15, i_2 = 0, \ldots, 15, \text{ and } \lfloor i_2/4 \rfloor$$

indicates that its value is the greatest integer not greater than $i_2/4$.

As another embodiment of the present invention, the precoding matrix W is at least one matrix in the matrix set shown in the expression (2) or (2'), where $$\theta = \frac{\pi}{16}(2i_1 + \lfloor i_2/4 \rfloor), i_1 = 0, \ldots, 15, i_2 = 0, \ldots, 15, \varphi = \frac{\pi}{16}, \frac{\pi}{8}, \ldots,$$

and $\lfloor i_2/4 \rfloor$ indicates that its value is the greatest integer not greater than $i_2/4$.

As another embodiment of the present invention, the precoding matrix W is at least one matrix in the matrix set shown in the expression (3), where $$\theta = \frac{\pi}{8}(4i_1 + 2\lfloor i_2/4 \rfloor), i_1 = 0, 1, 2, 3, i_2 = 0, \ldots, 15, \text{ and } \lfloor i_2/4 \rfloor$$

indicates that its value is the greatest integer not greater than $\lfloor i_2/4 \rfloor$.

As another embodiment of the present invention, the precoding matrix W is at least one matrix in the matrix set shown in the expression (4) or (5), where $$\theta = \frac{\pi}{8}(4i_1 + 2\lfloor i_2/4 \rfloor), i_1 = 0, 1, 2, 3, i_2 = 0, \ldots, 7, \text{ and } \lfloor i_2/2 \rfloor$$

indicates that its value is the greatest integer not greater than $i_2/2$.

It can be learned from investigation on the foregoing precoding matrix W that, the foregoing matrix structure may match actually deployed antenna configuration, for example, configuration of a four-port dual-polarized antenna or a uniform linear array antenna. Phases $\theta$ and $\phi$ are flexibly selected, which cannot only further improve quantization precision as required, but also achieve balance between overheads and the quantization precision. Column vectors of the precoding matrix W are orthogonal to each other, which further reduces inter-layer interference, thereby improving a transmission rate and spectral efficiency of a system.

The codebook is known to both the base station and the UE. As another embodiment of the present invention, the precoding matrix indicator PMI may include only one specific value, and the PMI directly indicates the selected precoding matrix. For example, altogether 256 different precoding matrices may be selected from the matrix set (1) or (2), and then PMI=0, . . . , 255 may be used to respectively indicate the precoding matrices whose index values are 0, 1, . . . , 255. In this case, the base station may obtain, according to the PMI, the precoding matrix selected by the UE from the codebook.

As another embodiment of the present invention, the precoding matrix indicator PMI may include two indexes, that is, a first precoding matrix indicator $PMI_1$ and a second precoding matrix indicator $PMI_2$, where the $PMI_1$ and the $PMI_2$ are respectively corresponding to index values $i_1$ and $i_2$ that are associated with the selected precoding matrix. The base station may obtain, according to the $PMI_1$ and the $PMI_2$, the precoding matrix selected by the UE from the codebook.

When a precoding matrix indicator PMI sent by a user equipment UE is received, the PMI may be received by a base station through a PUCCH or a PUSCH. It should be noted that, the precoding matrix W in this embodiment of the present invention may be a precoding matrix obtained after row or column permutation. For example, different antenna numbers correspondingly lead to row permutation of the precoding matrix.

It can be learned from the foregoing base station for feeding back channel state information according to this embodiment of the present invention that, the base station sends a reference signal and receives a precoding matrix indicator PMI sent by a UE, where the PMI is corresponding to a precoding matrix that is selected by the UE from a codebook based on the reference signal. The codebook includes at least one precoding matrix W, and a column vector of the precoding matrix W may be expressed as $\alpha[v \ e^{j\phi}v]^T$, $v=[1 \ e^{j\theta}]$, where $\alpha$ is a constant, $\theta$ and $\phi$ are phases, and $[\ ]^T$ indicates transposing of a matrix or vector. The foregoing codebook structure may match actually deployed antenna configuration, for example, configuration of a four-port dual-polarized antenna or a uniform linear array antenna; phases $\theta$ and $\phi$ are flexibly selected, which cannot only further improve quantization precision as required, but also achieve balance between overheads and the quantization precision. In addition, column vectors of the precoding matrix W are orthogonal to each other, which further reduces inter-layer interference. After the user equipment feeds back the precoding matrix indicator corresponding to the precoding matrix W to the base station, the base station performs precoding on a sent signal according to the fed back precoding matrix indicator, which improves system throughput.

An embodiment of the present invention further provides a computer storage medium, where the computer storage medium may store a program, and when the program is executed, the steps illustrated in FIG. 1 or FIG. 2 are performed.

It should be noted that content such as information exchange between the modules/units of the foregoing apparatus and the execution processes thereof is based on the same idea as the method embodiments of the present invention, and produces the same technical effects as the method embodiments of the present invention. For the specific content, refer to the description in the method embodiments of the present invention, and the details are not described herein again.

A person of ordinary skill in the art may understand that all or some of the steps of the foregoing embodiments may be implemented by a program that instructs related hardware, for example, one or more or all of the following methods:

Method 1: receiving a reference signal sent by a base station; selecting a precoding matrix W from a codebook according to the reference signal, where a column vector of the precoding matrix W is expressed as $\alpha[v \ e^{j\phi}v]^T$, $v=[1 \ e^{j\theta}]$, where $\alpha$ is a constant, $\theta$ and $\phi$ are phases, and $[\ ]^T$ indicates transposing of a matrix or vector; and sending a precoding matrix indicator PMI corresponding to the selected precoding matrix to the base station.

Method 2: sending a reference signal to a user equipment UE; receiving a precoding matrix indicator PMI sent by the UE, where the PMI is corresponding to a precoding matrix W that is selected by the UE from a codebook based on the reference signal, and a column vector of the precoding matrix W is expressed as $\alpha[v \ e^{j\phi}v]^T$, $v=[1 \ e^{j\theta}]$, where $\alpha$ is a constant, $\theta$ and $\phi$ are phases, and $[\ ]^T$ indicates transposing of a matrix or vector.

A person of ordinary skill in the art may understand that all or a part of the steps of the methods in the embodiments may be implemented by a program instructing related hardware. The program may be stored in a computer readable storage medium. The storage medium may include: a read-only memory (ROM), a random access memory (RAM), a magnetic disk, or an optical disc.

The foregoing has described a method for feeding back channel state information, a user equipment, and a base station according to the embodiments of the present invention in detail. Specific examples are used in this specification to expound the principles and implementation manners of the present invention. The description of the embodiments is merely intended to help understand the method of the present invention and core ideas thereof. In addition, persons of ordinary skill in the art can make various modifications and variations to the invention with respect to specific implementation manners and application scopes according to the ideas of the invention. In conclusion, the content of the specification shall not be construed as a limitation on the present invention.

What is claimed is:

1. A method for feeding back channel state information, wherein the method comprises:
  receiving a reference signal from a base station;
  selecting a precoding matrix W from a codebook based on the reference signal, wherein a column vector of the precoding matrix W is expressed as $\alpha[v \ e^{j\phi}v]^T$, $v=[1 \ e^{j\theta}]$, wherein $\alpha$ is a constant, $\theta$ and $\phi$ are phases, and $[\ ]^T$ indicates transposing of a matrix or vector; and
  sending a precoding matrix indicator (PMI) to the base station, wherein the PMI corresponds to the selected precoding matrix W,
  wherein the precoding matrix W is at least one matrix in the following matrix set:

$$\left\{\frac{1}{4}\begin{bmatrix} 1 & 1 & 1 & 1 \\ e^{j\theta} & -e^{j\theta} & e^{j\theta} & -e^{j\theta} \\ 1 & 1 & -1 & -1 \\ e^{j\theta} & -e^{j\theta} & -e^{j\theta} & e^{j\theta} \end{bmatrix}, \frac{1}{4}\begin{bmatrix} 1 & 1 & 1 & 1 \\ e^{j\theta} & -e^{j\theta} & e^{j\theta} & -e^{j\theta} \\ j & j & -j & -j \\ je^{j\theta} & -je^{j\theta} & -je^{j\theta} & je^{j\theta} \end{bmatrix}\right\} \text{ or}$$

$$\left\{\frac{1}{4}\begin{bmatrix} 1 & 1 & 1 & 1 \\ e^{j\theta} & e^{j\theta} & -e^{j\theta} & -e^{j\theta} \\ 1 & -1 & 1 & -1 \\ e^{j\theta} & -e^{j\theta} & -e^{j\theta} & e^{j\theta} \end{bmatrix}, \frac{1}{4}\begin{bmatrix} 1 & 1 & 1 & 1 \\ e^{j\theta} & e^{j\theta} & -e^{j\theta} & -e^{j\theta} \\ j & -j & j & -j \\ je^{j\theta} & -je^{j\theta} & -je^{j\theta} & je^{j\theta} \end{bmatrix}\right\} \text{ wherein}$$

$\theta = \frac{\pi}{8}(4i_1 + 2\lfloor i_2/2 \rfloor)$, $i_1 = 0, 1, 2, 3$, $i_2 = 0, \ldots, 7$, and $\lfloor i_2/2 \rfloor$ indicates the greatest integer not greater than $i_2/2$.

2. The method according to claim 1, wherein the sending a precoding matrix indicator (PMI) to the base station comprises:
  sending a first precoding matrix indicator ($PMI_1$) and a second precoding matrix indicator ($PMI_2$) to the base station, wherein the $PMI_1$ and the $PMI_2$ are respectively used to indicate indexes $i_1$ and $i_2$ corresponding to the selected precoding matrix W.

3. The method according to claim 1, wherein the precoding matrix W is a precoding matrix obtained after row or column permutation from the matrix set.

4. A method for feeding back channel state information, wherein the method comprises:
   sending a reference signal to a user equipment (UE); and
   receiving a precoding matrix indicator (PMI) from the UE, wherein the PMI corresponds to a precoding matrix W that is selected by the UE from a codebook based on the reference signal, and a column vector of the precoding matrix W is expressed as $\alpha[v\ e^{j\phi}v]^T$, $v=[1\ e^{j\theta}]$, wherein $\alpha$ is a constant, $\theta$ and $\phi$ are phases, and $[\ ]^T$ indicates transposing of a matrix or vector,
   wherein the precoding matrix W is at least one matrix in the following matrix set:

$$\left\{ \frac{1}{4}\begin{bmatrix} 1 & 1 & 1 & 1 \\ e^{j\theta} & -e^{j\theta} & e^{j\theta} & -e^{j\theta} \\ 1 & 1 & -1 & -1 \\ e^{j\theta} & -e^{j\theta} & -e^{j\theta} & e^{j\theta} \end{bmatrix}, \frac{1}{4}\begin{bmatrix} 1 & 1 & 1 & 1 \\ e^{j\theta} & -e^{j\theta} & e^{j\theta} & -e^{j\theta} \\ j & j & -j & -j \\ je^{j\theta} & -je^{j\theta} & -je^{j\theta} & je^{j\theta} \end{bmatrix} \right\} \text{ or}$$

$$\left\{ \frac{1}{4}\begin{bmatrix} 1 & 1 & 1 & 1 \\ e^{j\theta} & e^{j\theta} & -e^{j\theta} & -e^{j\theta} \\ 1 & -1 & 1 & -1 \\ e^{j\theta} & -e^{j\theta} & -e^{j\theta} & e^{j\theta} \end{bmatrix}, \frac{1}{4}\begin{bmatrix} 1 & 1 & 1 & 1 \\ e^{j\theta} & e^{j\theta} & -e^{j\theta} & -e^{j\theta} \\ j & -j & j & -j \\ je^{j\theta} & -je^{j\theta} & -je^{j\theta} & je^{j\theta} \end{bmatrix} \right\} \text{ wherein}$$

$$\theta = \frac{\pi}{8}(4i_1 + 2\lfloor i_2/2 \rfloor), i_1 = 0, 1, 2, 3, i_2 = 0, \ldots, 7, \text{ and } \lfloor i_2/2 \rfloor$$

indicates the greatest integer not greater than $i_2/2$.

5. The method according to claim 4, wherein the receiving a precoding matrix indicator PMI from the UE comprises:
   receiving a first precoding matrix indicator ($PMI_1$) and a second precoding matrix indicator ($PMI_2$) from the UE, wherein the $PMI_1$ and the $PMI_2$ are respectively used to indicate indexes $i_1$ and $i_2$ corresponding to the selected precoding matrix W.

6. The method according to claim 4, wherein the precoding matrix W is a precoding matrix obtained after row or column permutation from the matrix set.

7. A user equipment (UE), wherein the UE comprises:
   a receiver, the receiver configured to receive a reference signal from a base station;
   at least one processor, the at least one processor configured to select a precoding matrix W from a codebook based on the reference signal received by the receiver, wherein a column vector of the precoding matrix W is expressed as $\alpha[v\ e^{j\phi}v]^T$, $v=[1\ e^{j\theta}]$, wherein $\alpha$ is a constant, $\theta$ and $\phi$ are phases, and $[\ ]^T$ indicates transposing of a matrix or vector; and
   a transmitter, the transmitter configured to send a precoding matrix indicator (PMI) to the base station, wherein the PMI corresponds to the precoding matrix W,
   wherein the precoding matrix W is at least one matrix in the following matrix set:

$$\left\{ \frac{1}{4}\begin{bmatrix} 1 & 1 & 1 & 1 \\ e^{j\theta} & -e^{j\theta} & e^{j\theta} & -e^{j\theta} \\ 1 & 1 & -1 & -1 \\ e^{j\theta} & -e^{j\theta} & -e^{j\theta} & e^{j\theta} \end{bmatrix}, \frac{1}{4}\begin{bmatrix} 1 & 1 & 1 & 1 \\ e^{j\theta} & -e^{j\theta} & e^{j\theta} & -e^{j\theta} \\ j & j & -j & -j \\ je^{j\theta} & -je^{j\theta} & -je^{j\theta} & je^{j\theta} \end{bmatrix} \right\} \text{ or}$$

$$\left\{ \frac{1}{4}\begin{bmatrix} 1 & 1 & 1 & 1 \\ e^{j\theta} & e^{j\theta} & -e^{j\theta} & -e^{j\theta} \\ 1 & -1 & 1 & -1 \\ e^{j\theta} & -e^{j\theta} & -e^{j\theta} & e^{j\theta} \end{bmatrix}, \frac{1}{4}\begin{bmatrix} 1 & 1 & 1 & 1 \\ e^{j\theta} & e^{j\theta} & -e^{j\theta} & -e^{j\theta} \\ j & -j & j & -j \\ je^{j\theta} & -je^{j\theta} & -je^{j\theta} & je^{j\theta} \end{bmatrix} \right\} \text{ wherein}$$

$$\theta = \frac{\pi}{8}(4i_1 + 2\lfloor i_2/2 \rfloor), i_1 = 0, 1, 2, 3, i_2 = 0, \ldots, 7, \text{ and } \lfloor i_2/2 \rfloor$$

indicates the greatest integer not greater than $i_2/2$.

8. The UE according to claim 7, wherein the transmitter is further configured to:
   send a first precoding matrix indicator ($PMI_1$) and a second precoding matrix indicator ($PMI_2$) to the base station, wherein the $PMI_1$ and the $PMI_2$ are respectively used to indicate indexes $i_1$ and $i_2$ corresponding to the selected precoding matrix W.

9. The UE according to claim 7, wherein the precoding matrix W is a precoding matrix obtained after row or column permutation from the matrix set.

10. A base station, wherein the base station comprises:
    a transmitter, the transmitter configured to send a reference signal to a user equipment (UE); and
    a receiver, the receiver configured to receive a precoding matrix indicator (PMI) from the UE, wherein the PMI corresponds to a precoding matrix W that is selected by the UE from a codebook based on the reference signal, and a column vector of the precoding matrix W is expressed as $\alpha[v\ e^{j\phi}v]^T$, $v=[1\ e^{j\theta}]$, wherein $\alpha$ is a constant, $\theta$ and $\phi$ are phases, and $[\ ]^T$ indicates transposing of a matrix or vector,
    wherein the precoding matrix W is at least one matrix in the following matrix set:

$$\left\{ \frac{1}{4}\begin{bmatrix} 1 & 1 & 1 & 1 \\ e^{j\theta} & -e^{j\theta} & e^{j\theta} & -e^{j\theta} \\ 1 & 1 & -1 & -1 \\ e^{j\theta} & -e^{j\theta} & -e^{j\theta} & e^{j\theta} \end{bmatrix}, \frac{1}{4}\begin{bmatrix} 1 & 1 & 1 & 1 \\ e^{j\theta} & -e^{j\theta} & e^{j\theta} & -e^{j\theta} \\ j & j & -j & -j \\ je^{j\theta} & -je^{j\theta} & -je^{j\theta} & je^{j\theta} \end{bmatrix} \right\} \text{ or}$$

$$\left\{ \frac{1}{4}\begin{bmatrix} 1 & 1 & 1 & 1 \\ e^{j\theta} & e^{j\theta} & -e^{j\theta} & -e^{j\theta} \\ 1 & -1 & 1 & -1 \\ e^{j\theta} & -e^{j\theta} & -e^{j\theta} & e^{j\theta} \end{bmatrix}, \frac{1}{4}\begin{bmatrix} 1 & 1 & 1 & 1 \\ e^{j\theta} & e^{j\theta} & -e^{j\theta} & -e^{j\theta} \\ j & -j & j & -j \\ je^{j\theta} & -je^{j\theta} & -je^{j\theta} & je^{j\theta} \end{bmatrix} \right\} \text{ wherein}$$

$$\theta = \frac{\pi}{8}(4i_1 + 2\lfloor i_2/2 \rfloor), i_1 = 0, 1, 2, 3, i_2 = 0, \ldots, 7, \text{ and } \lfloor i_2/2 \rfloor$$

indicates the greatest integer not greater than $i_2/2$.

11. The base station according to claim 10, wherein the receiver is further configured to:
    receive a first precoding matrix indicator ($PMI_1$) and a second precoding matrix indicator ($PMI_2$) from the UE to the base station, wherein the $PMI_1$ and the $PMI_2$ are respectively used to indicate indexes $i_1$ and $i_2$ corresponding to the selected precoding matrix W.

12. The base station according to claim 10, wherein the precoding matrix W is a precoding matrix obtained after row or column permutation from the matrix set.

13. A communication apparatus, comprising:
    one or more processors;
    a non-transitory memory for storing computer instructions that when executed by the one or more processors cause the communication apparatus to perform operations comprising:
    receiving a reference signal from a base station;
    selecting a precoding matrix W from a codebook based on the reference signal, wherein a column vector of the precoding matrix W is expressed as $\alpha[v\ e^{j\phi}v]^T$, $v=[1\ e^{j\theta}]$, wherein $\alpha$ is a constant, $\theta$ and $\phi$ are phases, and $[\ ]^T$ indicates transposing of a matrix or vector; and sending a precoding matrix indicator (PMI) to the base station, wherein the PMI corresponds to the selected precoding matrix W, wherein the precoding matrix W is at least one matrix in the following matrix set:

$$\left\{\frac{1}{4}\begin{bmatrix}1 & 1 & 1 & 1\\ e^{j\theta} & -e^{j\theta} & e^{j\theta} & -e^{j\theta}\\ 1 & 1 & -1 & -1\\ e^{j\theta} & -e^{j\theta} & -e^{j\theta} & e^{j\theta}\end{bmatrix}, \frac{1}{4}\begin{bmatrix}1 & 1 & 1 & 1\\ e^{j\theta} & -e^{j\theta} & e^{j\theta} & -e^{j\theta}\\ j & j & -j & -j\\ je^{j\theta} & -je^{j\theta} & -je^{j\theta} & je^{j\theta}\end{bmatrix}\right\} \text{ or}$$

$$\left\{\frac{1}{4}\begin{bmatrix}1 & 1 & 1 & 1\\ e^{j\theta} & e^{j\theta} & -e^{j\theta} & -e^{j\theta}\\ 1 & -1 & 1 & -1\\ e^{j\theta} & -e^{j\theta} & -e^{j\theta} & e^{j\theta}\end{bmatrix}, \frac{1}{4}\begin{bmatrix}1 & 1 & 1 & 1\\ e^{j\theta} & e^{j\theta} & -e^{j\theta} & -e^{j\theta}\\ j & -j & j & -j\\ je^{j\theta} & -je^{j\theta} & -je^{j\theta} & je^{j\theta}\end{bmatrix}\right\} \text{ wherein}$$

$$\theta = \frac{\pi}{8}(4i_1 + 2\lfloor i_2/2 \rfloor),\ i_1 = 0, 1, 2, 3,\ i_2 = 0, \ldots, 7,$$

and $\lfloor i_2/2 \rfloor$ indicates the greatest integer not greater than $i_2/2$.

14. The communication apparatus according to claim 13, wherein the sending a precoding matrix indicator (PMI) to the base station comprises:

sending a first precoding matrix indicator (PMI$_1$) and a second precoding matrix indicator (PMI$_2$) to the base station, wherein the PMI$_1$ and the PMI$_2$ are respectively used to indicate indexes $i_1$ and $i_2$ corresponding to the selected precoding matrix W.

15. The communication apparatus according to claim 13, wherein the precoding matrix W is a precoding matrix obtained after row or column permutation from the matrix set.

16. A communication apparatus, comprising:

one or more processors;

a non-transitory memory for storing computer instructions that when executed by the one or more processors cause the communication apparatus to perform operations comprising:

sending a reference signal to a user equipment (UE); and receiving a precoding matrix indicator (PMI) from the UE, wherein the PMI corresponds to a precoding matrix W that is selected by the UE from a codebook based on the reference signal, and a column vector of the precoding matrix W is expressed as $\alpha[v\ e^{j\phi}v]^T$, $v=[1\ e^{j\theta}]$, wherein $\alpha$ is a constant, $\theta$ and $\phi$ are phases, and $[\ ]^T$ indicates transposing of a matrix or vector, wherein the precoding matrix W is at least one matrix in the following matrix set:

$$\left\{\frac{1}{4}\begin{bmatrix}1 & 1 & 1 & 1\\ e^{j\theta} & -e^{j\theta} & e^{j\theta} & -e^{j\theta}\\ 1 & 1 & -1 & -1\\ e^{j\theta} & -e^{j\theta} & -e^{j\theta} & e^{j\theta}\end{bmatrix}, \frac{1}{4}\begin{bmatrix}1 & 1 & 1 & 1\\ e^{j\theta} & -e^{j\theta} & e^{j\theta} & -e^{j\theta}\\ j & j & -j & -j\\ je^{j\theta} & -je^{j\theta} & -je^{j\theta} & je^{j\theta}\end{bmatrix}\right\} \text{ or}$$

$$\left\{\frac{1}{4}\begin{bmatrix}1 & 1 & 1 & 1\\ e^{j\theta} & e^{j\theta} & -e^{j\theta} & -e^{j\theta}\\ 1 & -1 & 1 & -1\\ e^{j\theta} & -e^{j\theta} & -e^{j\theta} & e^{j\theta}\end{bmatrix}, \frac{1}{4}\begin{bmatrix}1 & 1 & 1 & 1\\ e^{j\theta} & e^{j\theta} & -e^{j\theta} & -e^{j\theta}\\ j & -j & j & -j\\ je^{j\theta} & -je^{j\theta} & -je^{j\theta} & je^{j\theta}\end{bmatrix}\right\} \text{ wherein}$$

-continued $$\theta = \frac{\pi}{8}(4i_1 + 2\lfloor i_2/2 \rfloor),\ i_1 = 0, 1, 2, 3,\ i_2 = 0, \ldots, 7,$$

and $\lfloor i_2/2 \rfloor$ indicates the greatest integer not greater than $i_2/2$.

17. The communication apparatus according to claim 16, wherein the receiving a precoding matrix indicator (PMI) from the UE comprises:

receiving a first precoding matrix indicator (PMI$_1$) and a second precoding matrix indicator (PMI$_2$) from the UE, wherein the PMI$_1$ and the PMI$_2$ are respectively used to indicate indexes $i_1$ and $i_2$ corresponding to the selected precoding matrix.

18. The communication apparatus according to claim 16, wherein the precoding matrix W is a precoding matrix obtained after row or column permutation from the matrix set.

19. A non-transitory computer-readable storage media comprising computer instructions that when executed by a computer, cause the computer to perform operations comprising:

receiving a reference signal from a base station;

selecting a precoding matrix W from a codebook based on the reference signal, wherein a column vector of the precoding matrix W is expressed as $\alpha[v\ e^{j\phi}v]^T$, $v=[1\ e^{j\theta}]$, wherein $\alpha$ is a constant, $\theta$ and $\phi$ are phases, and $[\ ]^T$ indicates transposing of a matrix or vector; and sending a precoding matrix indicator (PMI) to the base station, wherein the PMI corresponds to the selected precoding matrix W, wherein the precoding matrix W is at least one matrix in the following matrix set:

$$\left\{\frac{1}{4}\begin{bmatrix}1 & 1 & 1 & 1\\ e^{j\theta} & -e^{j\theta} & e^{j\theta} & -e^{j\theta}\\ 1 & 1 & -1 & -1\\ e^{j\theta} & -e^{j\theta} & -e^{j\theta} & e^{j\theta}\end{bmatrix}, \frac{1}{4}\begin{bmatrix}1 & 1 & 1 & 1\\ e^{j\theta} & -e^{j\theta} & e^{j\theta} & -e^{j\theta}\\ j & j & -j & -j\\ je^{j\theta} & -je^{j\theta} & -je^{j\theta} & je^{j\theta}\end{bmatrix}\right\} \text{ or}$$

$$\left\{\frac{1}{4}\begin{bmatrix}1 & 1 & 1 & 1\\ e^{j\theta} & e^{j\theta} & -e^{j\theta} & -e^{j\theta}\\ 1 & -1 & 1 & -1\\ e^{j\theta} & -e^{j\theta} & -e^{j\theta} & e^{j\theta}\end{bmatrix}, \frac{1}{4}\begin{bmatrix}1 & 1 & 1 & 1\\ e^{j\theta} & e^{j\theta} & -e^{j\theta} & -e^{j\theta}\\ j & -j & j & -j\\ je^{j\theta} & -je^{j\theta} & -je^{j\theta} & je^{j\theta}\end{bmatrix}\right\} \text{ wherein}$$

$$\theta = \frac{\pi}{8}(4i_1 + 2\lfloor i_2/2 \rfloor),\ i_1 = 0, 1, 2, 3,\ i_2 = 0, \ldots, 7,\ \text{and } \lfloor i_2/2 \rfloor$$

indicates the greatest integer not greater than $i_2/2$.

20. The non-transitory computer-readable storage media according to claim 19, wherein the sending a precoding matrix indicator (PMI) to the base station comprises:

sending a first precoding matrix indicator (PMI$_1$) and a second precoding matrix indicator (PMI$_2$) to the base station, wherein the PMI$_1$ and the PMI$_2$ are respectively used to indicate indexes $i_1$ and $i_2$ corresponding to the selected precoding matrix W.

21. The non-transitory computer-readable storage media according to claim 19, wherein the precoding matrix W is a precoding matrix obtained after row or column permutation from the matrix set.

22. A non-transitory computer-readable storage media comprising computer instructions that when executed by a computer, cause the computer to perform operations comprising:

sending a reference signal to a user equipment (UE); and
receiving a precoding matrix indicator (PMI) from the UE, wherein the PMI corresponds to a precoding matrix W that is selected by the UE from a codebook based on the reference signal, and a column vector of the precoding matrix W is expressed as $\alpha[v\ e^{j\phi}v]^T$, $v=[1\ e^{j\theta}]$, wherein $\alpha$ is a constant, $\theta$ and $\phi$ are phases, and $[\ ]^T$ indicates transposing of a matrix or vector, wherein the precoding matrix W is at least one matrix in the following matrix set:

$$\left\{ \frac{1}{4}\begin{bmatrix} 1 & 1 & 1 & 1 \\ e^{j\theta} & -e^{j\theta} & e^{j\theta} & -e^{j\theta} \\ 1 & 1 & -1 & -1 \\ e^{j\theta} & -e^{j\theta} & -e^{j\theta} & e^{j\theta} \end{bmatrix}, \frac{1}{4}\begin{bmatrix} 1 & 1 & 1 & 1 \\ e^{j\theta} & -e^{j\theta} & e^{j\theta} & -e^{j\theta} \\ j & j & -j & -j \\ je^{j\theta} & -je^{j\theta} & -je^{j\theta} & je^{j\theta} \end{bmatrix} \right\} \text{ or }$$

$$\left\{ \frac{1}{4}\begin{bmatrix} 1 & 1 & 1 & 1 \\ e^{j\theta} & e^{j\theta} & -e^{j\theta} & -e^{j\theta} \\ 1 & -1 & 1 & -1 \\ e^{j\theta} & -e^{j\theta} & -e^{j\theta} & e^{j\theta} \end{bmatrix}, \frac{1}{4}\begin{bmatrix} 1 & 1 & 1 & 1 \\ e^{j\theta} & e^{j\theta} & -e^{j\theta} & -e^{j\theta} \\ j & -j & j & -j \\ je^{j\theta} & -je^{j\theta} & -je^{j\theta} & je^{j\theta} \end{bmatrix} \right\} \text{ wherein}$$

$$\theta = \frac{\pi}{8}(4i_1 + 2\lfloor i_2/2 \rfloor),\ i_1 = 0, 1, 2, 3,\ i_2 = 0, \ldots, 7,\ \text{and } \lfloor i_2/2 \rfloor$$

indicates the greatest integer not greater than $i_2/2$.

23. The non-transitory computer-readable storage media according to claim 22, wherein the receiving a precoding matrix indicator (PMI) from the UE comprises:

receiving a first precoding matrix indicator (PMI$_1$) and a second precoding matrix indicator (PMI$_2$) from the UE, wherein the PMI$_1$ and the PMI$_2$ are respectively used to indicate indexes $i_1$ and $i_2$ corresponding to the selected precoding matrix.

24. The non-transitory computer-readable storage media according to claim 22, wherein the precoding matrix W is a precoding matrix obtained after row or column permutation from the matrix set.

* * * * *

UNITED STATES PATENT AND TRADEMARK OFFICE
CERTIFICATE OF CORRECTION

PATENT NO. : 10,715,239 B2
APPLICATION NO. : 16/599877
DATED : July 14, 2020
INVENTOR(S) : Jianguo Wang, Yongxing Zhou and Leiming Zhang Page 1 of 1

It is certified that error appears in the above-identified patent and that said Letters Patent is hereby corrected as shown below:

In the Claims

In Column 24, Line 25, in Claim 10, after "as" delete "a".

In Column 24, Line 50, in Claim 11, delete "(PMI)" and insert -- $(PMI_1)$ --, therefor.

In Column 25, Line 29, in Claim 14, delete "(PMI)" and insert -- $(PMI_1)$ --, therefor.

Signed and Sealed this
Fifth Day of January, 2021

Andrei Iancu
*Director of the United States Patent and Trademark Office*